United States Patent
Wijnands et al.

(10) Patent No.: US 11,018,886 B1
(45) Date of Patent: May 25, 2021

(54) METHODS AND APPARATUS FOR SELECTIVELY FILTERING AN IP MULTICAST DATA STREAM FOR SELECTED GROUP MEMBERS OF A MULTICAST GROUP

(71) Applicant: Cisco Technology, Inc., San Jose, CA (US)

(72) Inventors: Ijsbrand Wijnands, Leuven (BE); Hendrikus G. P. Bosch, Aalsmeer (NL); Sape Jurriën Mullender, Amsterdam (NL); Subhasri Dhesikan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 306 days.

(21) Appl. No.: 16/136,636

(22) Filed: Sep. 20, 2018

(51) Int. Cl.
*H04L 12/18* (2006.01)
*H04L 29/06* (2006.01)
*H04L 12/935* (2013.01)

(52) U.S. Cl.
CPC ............ *H04L 12/185* (2013.01); *H04L 69/18* (2013.01); *H04L 49/309* (2013.01)

(58) Field of Classification Search
CPC ..... H04L 12/18; H04L 12/185; H04L 12/189; H04L 12/1836; H04L 12/1886; H04L 12/4633; H04L 12/4641; H04L 29/12292; H04L 29/06027; H04L 29/12009; H04L 45/16; H04L 45/54; H04L 45/74; H04L 45/745; H04L 47/806; H04L 49/201; H04L 61/2069; H04L 65/4076; H04W 4/06; H04W 84/12; H04W 84/18
See application file for complete search history.

(56) References Cited

U.S. PATENT DOCUMENTS

| | | |
|---|---|---|
| 6,484,209 B1 | 11/2002 | Momlrov |
| 6,658,002 B1 | 12/2003 | Ross et al. |
| 8,861,347 B2 | 10/2014 | Bloch et al. |
| 9,571,897 B2 | 2/2017 | Shepherd et al. |
| 9,749,410 B2 | 8/2017 | Thubert et al. |
| 2002/0150094 A1* | 10/2002 | Cheng ................. H04L 12/1854 370/389 |
| 2005/0091313 A1* | 4/2005 | Zhou ..................... H04L 63/101 709/204 |
| 2010/0049860 A1 | 2/2010 | Kouvelas et al. |

(Continued)

*Primary Examiner* — Marsha D Banks Harold
*Assistant Examiner* — Dharmesh J Patel
(74) *Attorney, Agent, or Firm* — Merchant & Gould P.C.

(57) ABSTRACT

An IP multicast group may include a plurality of group members corresponding to a plurality of host receivers that are connected to router nodes of a multicast distribution tree and joined in the multicast group. At least some of the router nodes may store a plurality of group member indicator bits associated with the multicast group. Each group member indicator bit may be assigned to a respective one of the group members and indicate whether the respective group member is reachable downstream from the router node. During IP multicast, the router node may receive an IP multicast message having a destination address field, a source address field, and a payload field. The payload field may include one or more data items of a multicast data stream. The destination address field may include a multicast group address for addressing communications to the multicast group.

20 Claims, 16 Drawing Sheets

(56) References Cited

U.S. PATENT DOCUMENTS

2014/0075108 A1 3/2014 Dong et al.
2015/0131660 A1* 5/2015 Shepherd ............... H04L 45/74
　　　　　　　　　　　　　　　　　　　370/390

* cited by examiner

Entry 510: | Group Address 512 | Source Address 514 | Mask 516 | Ingress Interface 520 | Flags 522 | Egress Interface 530 | Flags 532: F 534 | SP 536 | NS 538 |

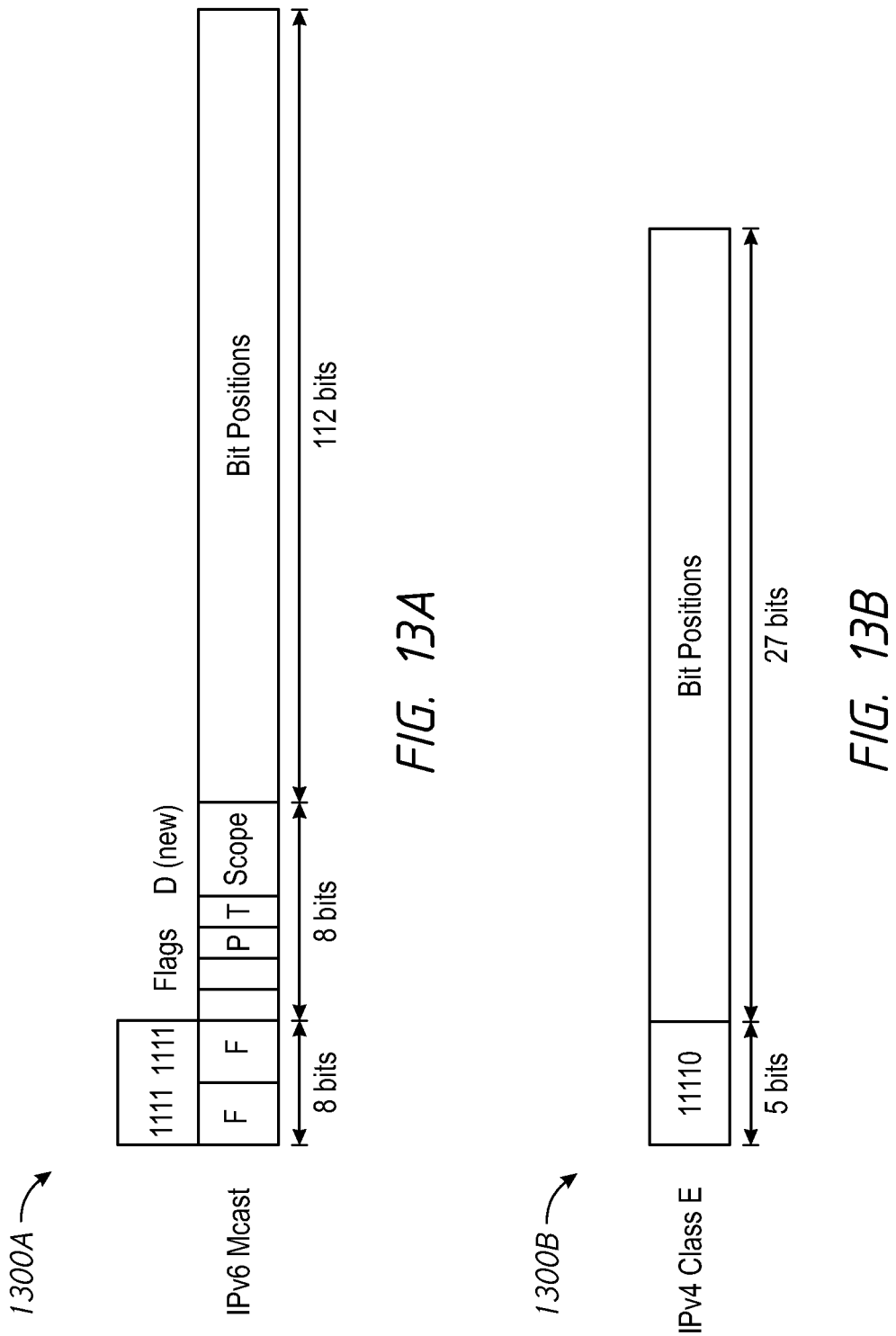

US 11,018,886 B1

METHODS AND APPARATUS FOR SELECTIVELY FILTERING AN IP MULTICAST DATA STREAM FOR SELECTED GROUP MEMBERS OF A MULTICAST GROUP

TECHNICAL FIELD

The present disclosure relates generally to IP multicasting in communication networks, and more particularly to methods and apparatus for selectively filtering an IP multicast data stream for selected group members of a multicast group in a communication network.

BACKGROUND

There is a need for selectively filtering an IP multicast data stream for selected group members of a multicast group connected in a multicast distribution tree.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 is a schematic block diagram of an illustrative embodiment of a multicast forwarding table that may be used herein;

FIGS. 13A and 13B are specific examples of source address fields that may be utilized for router filtering enable bits according to some implementations of the present disclosure;

Figure 1:
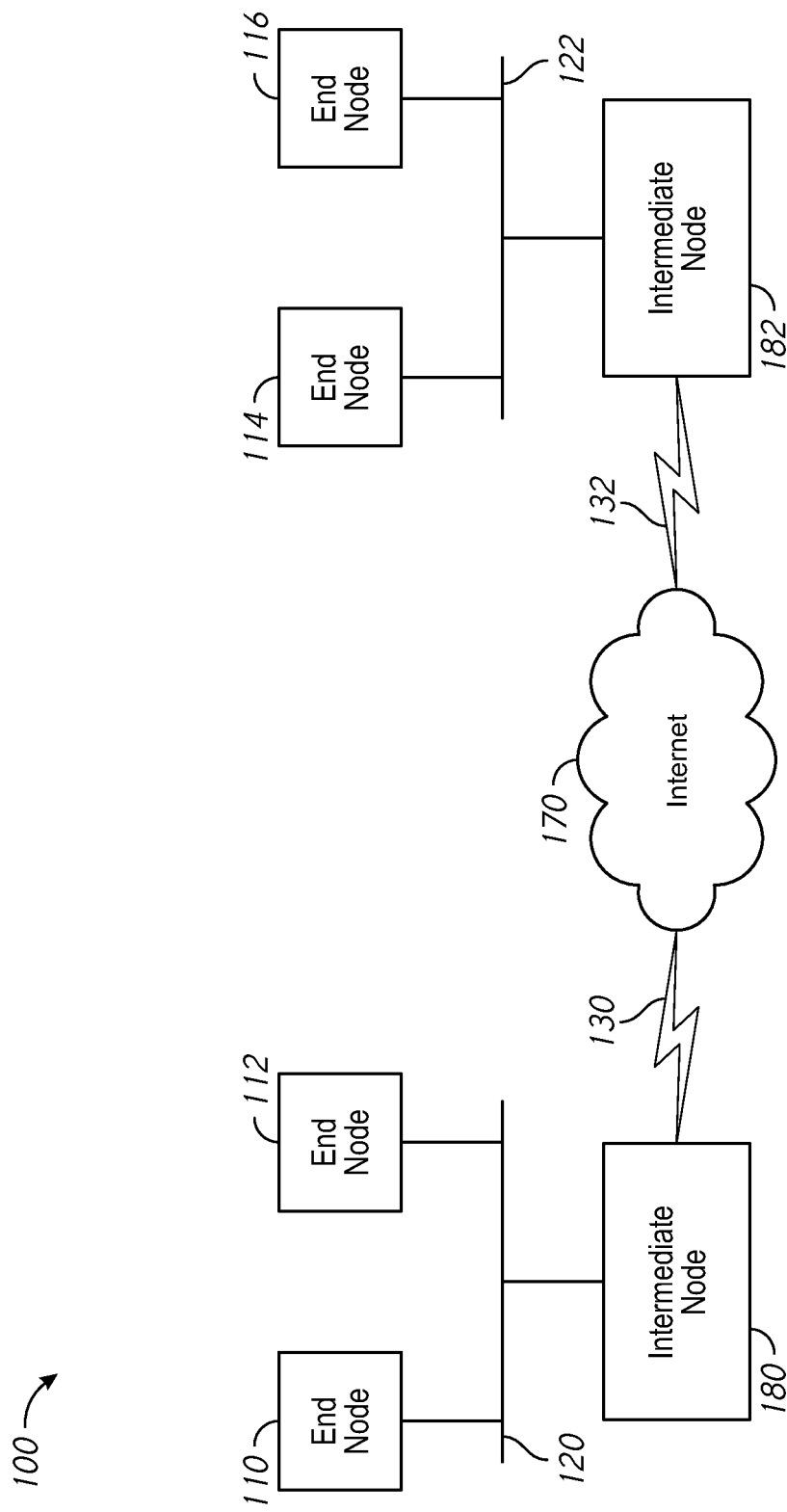
FIG. 1 is a schematic block diagram of a communication or computer network.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Methods and apparatus for use in selectively filtering an IP multicast data stream for selected group members of a multicast group are described herein. At least some of the implementations of the present disclosure may be referred to as "Bit Index Multicast Filtering" ("BIMF").

In one illustrative example, a source node may be configured to multicast a data stream to a multicast group of host receivers via a multicast distribution tree. The source node may generate one or more IP multicast messages, each of which have a message format which includes a destination address field, a source address field, and a payload field. The payload field may include one or more data items of a multicast data stream. The destination address field may include a multicast group address for addressing communications to the multicast group. The multicast group may include a plurality of group members corresponding to a plurality of host receivers that are connected to router nodes of the multicast distribution tree and joined in the multicast group. The source address field (or other suitable field) may include a plurality of router filtering enable bits in place of a source address. Each router filtering enable bit may be assigned to a respective one of the group members for a selective enabling of router filtering of the multicast data stream intended for the respective group member. The generated IP multicast message may be sent from the source node to (e.g. a first) one of the router nodes in the multicast distribution tree, for delivery of the multicast data stream to at least some of the group members. The at least some group members may exclude those group members assigned to a router filtering enable bit that is enabled for router filtering of the multicast data stream. The at least some group members that receive the multicast data stream may include those group members assigned to a router filtering enable bit that is disabled.

In another illustrative example, an IP multicast group may include a plurality of group members corresponding to a plurality of host receivers that are connected to router nodes of a multicast distribution tree and joined in the multicast group. At least some of the router nodes may store a plurality of group member indicator bits, where each such bit is assigned to a respective one of the group members and indicates whether the respective group member is reachable downstream from the router node. The group member indicator bits may alternatively be referred to as group member reachability bits, as host reachability indicators. The router node may receive an IP one or more IP multicast messages, each of which has a message format including a destination address field, a source address field, and a payload field. The payload field may include one or more data items of a multicast data stream. The destination address field may include a multicast group address for addressing communications to the multicast group. The source address field may include a plurality of router filtering enable bits in place of a source address, where each such bit may be assigned to a respective one of the group members for a selective enabling of router filtering of the multicast data stream intended for the respective group member. The router node may allow or disallow a forwarding of the multicast data stream to a next one of the router nodes in the multicast distribution tree based on the router filter enable bits and the stored group member indicator bits. For example, the router node may perform a logical "AND" operation between the router filter enable bits and the stored group member indicator bits, and allow or disallow the forwarding of the multicast data stream based on a result of the logical "AND" operation.

More detailed and alternative techniques and implementations are provided herein as will be described below.

EXAMPLE EMBODIMENTS

Data communication in a computer network may involve the exchange of data between two or more entities interconnected by communication links, segments and subnetworks. These entities are typically software processes executing on hardware computer platforms, such as end nodes and intermediate nodes. Communication software executing on the end nodes correlate and manage data communication with other end nodes. For general network (e.g. Internet) communications, the nodes typically communicate by exchanging discrete frames or packets of data according to predefined protocols, such as the Transmission Control Protocol/Internet Protocol (TCP/IP).

An intermediate node, such as a router, may interconnect the subnetworks to extend the effective "size" of the computer network. The router executes routing protocols used to direct the transmission of data traffic between the end nodes, such as hosts. Typically, the router directs network traffic based on destination address prefixes contained in the packets (i.e. the portions of destination addresses used by the routing protocol to render routing or "next hop" forwarding decisions). Examples of such destination addresses include Internet Protocol (IP) version 4 (IPv4) and version 6 (IPv6) addresses. A prefix implies a combination of an IP address and a mask that cooperate to describe an area or range of the network that a router can reach, whereas a route implies a combination of a set of path attributes and a prefix.

Unicast data transfer (i.e. unicast forwarding) involves forwarding a data packet from a single sending process of an end node ("host source") to a single receiving process of an end node ("host receiver") on the computer network. Often the destination of the data packet issued by a host source may be more than one, but less than all of the host receives on the network. This type of multicast data transfer (i.e. multicast forwarding) is typically employed to segregate communication between groups of host receivers on the network. IP multicasting, in particular, may be used to disseminate data to a large group of host receivers on the network.

IP multicast is a bandwidth-conserving technique that reduces traffic by simultaneously delivering a single stream of information to potentially thousands of corporate recipients and homes. Applications that take advantage of multicast include video conferencing, corporate communications, distance learning, and distribution of software, stock quotes, and news. IP multicast delivers application source traffic to multiple host receivers without burdening the source or the host receivers while using a minimum of network bandwidth. Multicast packets are replicated in the network at the point where paths diverge by routers enabled with Protocol Independent Multicast (PIM) and other supporting multicast protocols, resulting in the most efficient delivery of data to multiple host receivers.

Many alternatives to IP multicast require the source to send more than one copy of the data. Some, such as application-level multicast, require the source to send an individual copy to each host receiver. Even low-bandwidth applications can benefit from using IP multicast when there are thousands of host receivers. High-bandwidth applications, such as Motion Picture Experts Group (MPEG) video, may require a large portion of the available network bandwidth for a single stream. In these applications, IP multicast is the (e.g. only) satisfactory way to send to more than one host receiver simultaneously.

Host receivers of a designated multicast group may be interested in receiving the video data stream from the source. The host receivers indicate their interest by sending an Internet Group Management Protocol (IGMP) host report to the routers in the network. The routers are then responsible for delivering the data from the source to the host receivers. The routers use PIM to dynamically create a multicast distribution tree. The video data stream will then be delivered only to the network segments that are in the path between the source and the host receivers. This process is further explained in the following sections.

Multicast is based on the concept of a group. A multicast group may be an arbitrary group of host receivers that expresses an interest in receiving a particular data stream. This group has no physical or geographical boundaries; the hosts may be located anywhere on the Internet or any private internetwork. Hosts that are interested in receiving data flowing to a particular group typically join the group using IGMP. In order to receive the data stream, hosts may join the group to become a group member.

More specifically, IP multicast addresses may specify a set of IP hosts that have joined a group to express an interest in receiving multicast traffic designated for that particular group. IPv4 multicast address conventions may be described as follows. For IP Class D Addresses, the Internet Assigned Numbers Authority (IANA) controls the assignment of IP multicast addresses. IANA has assigned the IPv4 Class D address space to be used for IP multicast. Therefore, all IP multicast group addresses fall in the range from 224.0.0.0 through 239.255.255.255. The Class D address range is used (only) for the group address or destination address of IP multicast traffic. In conventional operation, the source address for multicast datagrams may be the unicast source address.

To affect IP multicasting, the source generally specifies a destination IP address that is a multicast group address for the message and, as such, can only represent host receivers of packets. The IPv4 (or IPv6) address range is subdivided into different prefixes, one of which is designated for use by IP multicast. Host receivers typically notify their communication software of their desire to receive messages destined for the multicast group address; this is called "joining a multicast group". These receiving members then "listen" on the multicast address and, when a multicast message is received at a host receiver, it delivers a copy of the message to each process that belongs to the group.

IP multicasting may rely on (i) a group management protocol to establish and maintain local multicast group membership, and (ii) multicast routing protocols to route packets efficiently. The IGMP manages packet communication between hosts and their local multicast router, letting them join or leave groups. That is, IGMP is used to send a group membership message from a host to its directly connected ("last-hop") router, indicating that the host wants to join a group (address) as a host receiver. Note that IGMP is an IPv4 group membership protocol; the conventional Multicast Listener Discovery (MLD) protocol is substantially similar to, and performs the same functions as, IGMP, but for IPv6. When group membership is established, multicast packets (identified by a multicast group address in the destination address field of an IP header) are forwarded between routers using multicast routing protocols.

Multicast routing protocols construct distribution trees through the network and direct multicast forwarding. The multicast distribution trees define the path that multicast traffic will take through the network to group members. These paths are based on source or shared multicast distribution trees. A multicast distribution tree is shared when any host source originating data traffic destined to a group address of a multicast group uses the same distribution tree to forward data to the host receivers. In contrast, a source distribution tree is a separate, shortest path tree (SPT) built for each source originating traffic to the multicast group.

A rendezvous point (RP) is a specific router that is designated as the root of a shared multicast distribution tree. An announcement protocol is used to select and announce rendezvous points to all routers in the network. However, an alternative to using an announcement protocol to automatically advertise rendezvous points to all routers in the network is to manually configure the identity of the rendezvous points on all of the routers. Examples of such an announcement protocol include the Auto-RP multicast protocol available from Cisco Systems Inc. and the Bootstrap Router (BSR) described in Bootstrap Router (BSR) Mechanism for PIM Sparse Mode, Internet Engineering Task Force Internet-Draft, draft-ietf-pim-sm-bsr-03.txt, by Fenner, et al. February 2003. Examples of multicast routing protocols that use a rendezvous point include Protocol Independent Multicast-Sparse Mode (PIM-SM) and Bidirectional PIM (BIDIR-PIM) protocols. Other multicast protocols that do not require a rendezvous point include PIM dense mode (PIM-DM) and PIM source specific multicast (PIM-SSM) protocols.

IP multicast may be deployed on a computer network using a specific rendezvous point to build a shared multicast distribution tree for a multicast group falling within a destination address prefix or to build a separate SPT for each source originating traffic to the multicast group. A router may join a multicast group (distribution tree) towards the rendezvous point or source. The interface on the router leading towards the rendezvous point or source is an ingress interface. Depending upon the multicast routing protocol, there is usually only one ingress interface on the router receiving multicast packets for a particular route. One or more interfaces on the router leading towards the host receivers are egress interfaces. The host receivers are leaves or nodes on the distribution tree. Packets are sent from a source to the root (rendezvous point or source itself) of the distribution tree, where they are forwarded towards the branches and out to the nodes that represent the host receivers. On each node, packets are received on the ingress interface towards the root of the tree and packets are forwarded out egress interfaces towards the host receivers or nodes.

Specifically, a host receiver may use IGMP to communicate a request to join a multicast group address to a last-hop router. The router communicates that request to its neighboring routers (neighbors) on the link towards the rendezvous point (for a shared tree) or source (for a SPT) using a multicast routing protocol, such as PIM. Auto-RP or BSR is used to distribute group range-to-rendezvous point address mapping configuration to all PIM-enabled routers that participate in the network topology. Collectively the routers construct a multicast distribution tree rooted at a rendezvous point or source for that group address and having a branch (link) that "pulls" packets towards the last-hop router. Note that only a single multicast router (forwarder) should forward packets for a route over a specific link of the tree.

The infrastructure of a router typically comprises functional components organized as a control plane and a data plane. The control plane includes the functional components needed to manage the traffic forwarding features of the router. These components include routing protocols, configuration information and other similar functions that determine the destinations of data packets based on information other than that contained within the packets. The data plane, on the other hand, includes functional components needed to perform forwarding operations for the packets.

For a single processor router, the control and data planes are typically implemented on the single processor. However, for some high-performance routers, these planes are implemented within separate devices of the intermediate node. For example, the control plane may be implemented in a supervisor processor, whereas the data plane may be implemented within a hardware-assist device, such as a co-processor or a forwarding processor. In other words, the data plane is typically implemented in hardware that is separate from the hardware that implements the control plane.

Referring now to FIG. 1, a schematic block diagram of a communication or computer network 100 is shown. The computer network 100 comprises a collection of communication links, segments and subnetworks connected to a plurality of nodes, such as end nodes 110 and 112 connected to an intermediate node 180, and end nodes 114 and 116 connected to an intermediate node 182. The links, segments and subnetworks may comprise local area networks (LANs) 120 and 122, wide area networks (WANs) such as the Internet 170, and WAN links 130 and 132 interconnected by intermediate nodes 180 and 182, respectively, which may be network switches or routers, to form a network of computer nodes.

Figure 2:
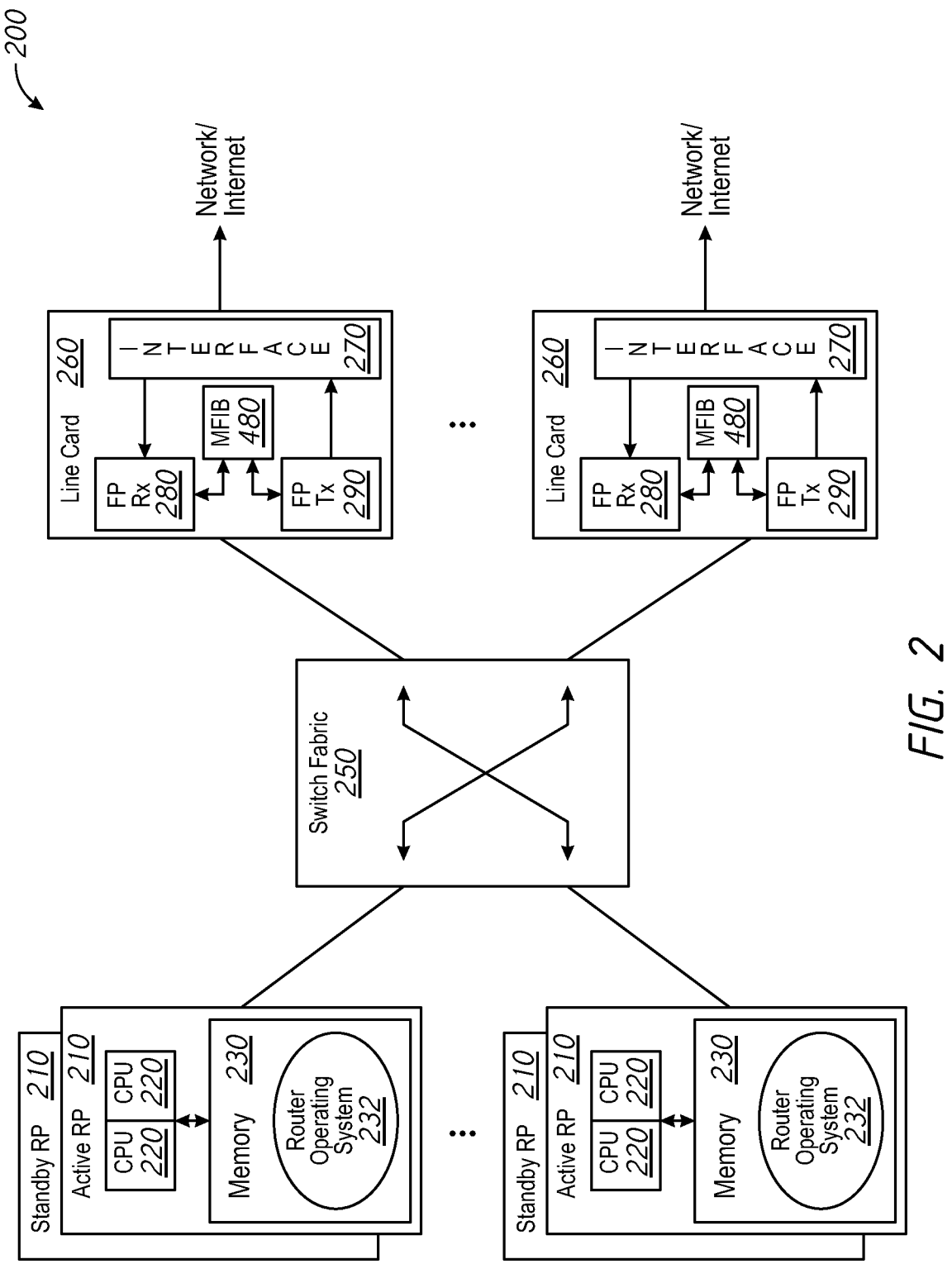
FIG. 2 is a schematic block diagram of a router or router node, such as multicast router or router node.

FIG. 2 is a schematic block diagram of a router, such as multicast router 200. The router 200 comprises a plurality of loosely coupled processors 210 connected to a plurality of ingress and egress line cards (line cards 260) via an interconnect 250 such as, e.g. a crossbar interconnection or high-speed bus. Those skilled in the art will recognize that other router platforms such as, e.g. a uniprocessor system or a plurality of independent nodes interconnected via a communications fabric as a multi-node cluster, could be used. In this context, the term "node" denotes a computer or processor complex comprising processors and an independent memory shared by the processors.

The processors 210 are illustratively route processors or "RPs" configured as active and standby RP pairs, with each processor having a dedicated memory 230. The memory 230 may comprise storage locations addressable by the processor for storing software programs and data structures. The processor 210 may comprise processing elements or logic for executing the software programs and manipulating the data structures. A router operating system 232, portions of which are typically resident in memory 230 and executed by the processor, functionally organizes the router by, inter alia, invoking network operations in support of software processes (described herein) executing on the processor. It will be apparent to those skilled in the art that other processor and memory means, including various computer readable media, may be used for storing and executing program instructions pertaining to the inventive technique described herein.

In some instances, the line cards may perform forwarding of the data traffic, while the route processors handle routing and control of the data traffic forwarding. Each route processor comprises two central processing units (CPUs 220), e.g. Power-PC 7460 chips, configured as a symmetric multiprocessing (SMP) pair. The CPU SMP pair is adapted to run a single copy of the router operating system 232 and access its memory space 230. Each line card 260 comprises an interface 270 having a plurality of ports coupled to a receive forwarding processor (FP Rx 280) and a transmit forwarding processor (FP Tx 290). The FP Rx 280 renders a forwarding decision for each packet received at the router on an ingress interface of an ingress line card in order to determine where to forward the packet. To that end, the FP Rx makes use of a multicast forwarding information base (MFIB) 480, described further herein. In the event that the packet is to be forwarded to one of the router's route processors, the FP Rx makes use of an internal FIB, IFIB, to determine to which route processor the packet should be forwarded. Likewise, the FP Tx 290 performs lookup operations (using MFIB 480) on a packet transmitted from the router via one or more egress interfaces of an egress line card.

Figures 3, 4:
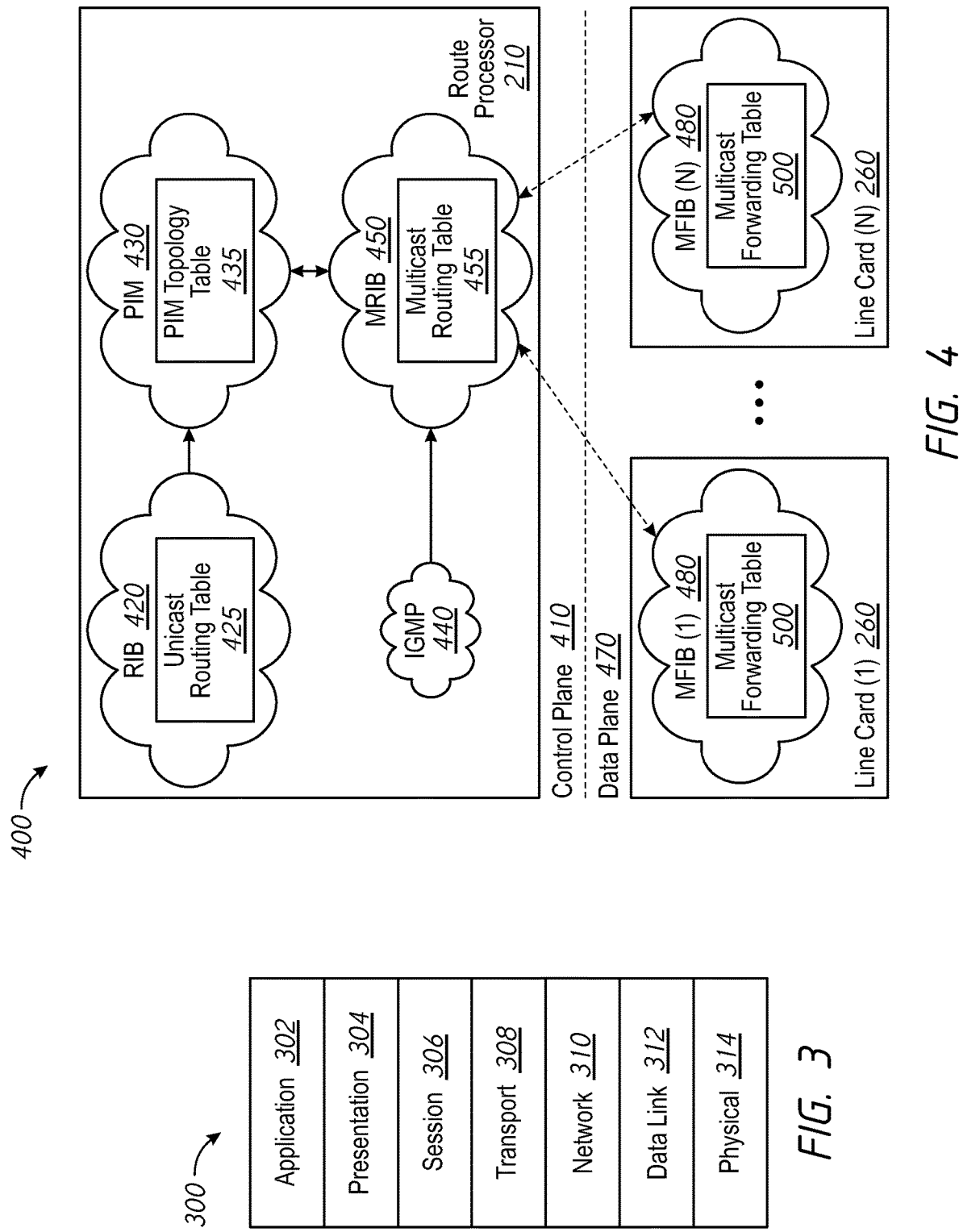
FIG. 3 is a schematic block diagram of a conventional network protocol stack, such as an Internet communications protocol stack.
FIG. 4 is a schematic block diagram illustrating an example functional infrastructure of the router of FIG. 2.

A key function of the router 200 is determining one or more interfaces to which a packet is forwarded in the router. In order to accomplish such routing, the routers cooperate to determine the best paths through the computer network 100 (FIG. 1). Such a routing function may generally be performed by one or more layers of a conventional protocol stack within each router. To better illustrate, FIG. 3 is a block diagram of a conventional network protocol stack, such as an Internet communications protocol stack 300. In particular, protocol stack 300 of FIG. 3 is that defined by the International Standards Organization (ISO) 7-layer Open Systems Interconnection (OSI) model. Protocol stack 300 includes a plurality of layers which include, in descending order, an application layer 302, a presentation layer 304, a session layer 306, a transport layer 308, a network layer 310, a data link 312, and physical layer 314. The lower layers are generally standardized and implemented in hardware and firmware, whereas the higher layers are typically implemented in the form of software. A router is generally configured to process at the physical 314, data link 312, and network layers 310, whereas a switch is generally configured to process at the physical 314 and data link layers 312.

As is well-known, the primary layer protocol of the Internet architecture is the IP protocol (IP). IP is primarily a connectionless protocol that provides for routing, fragmentation and assembly of exchanged packets—generally referred to as "datagrams" in an Internet environment. IP relies on transport protocols for end-to-end reliability and other service characteristics. An example of such a transport protocol is the TCP protocol, providing connection-oriented, end-to-end reliability services to the upper layer protocols of the Internet architecture. For IP multicasting, however, other suitable protocols may be utilized, such as a real-time transport protocol (RTP)/IP.

Network layer 310 is concerned with how packets are routed or forwarded through the network. A multicast routing protocol may be used to perform multicast routing through the computer network. Examples of multicast protocols may include the Protocol Independent Multicast-Sparse Mode (PIM-SM) and PIM source specific multicast (PIM-SSM) routing protocols, along with the Internet Group Membership Protocol (IGMP). These protocols are well-known and described in detail in *Protocol Independent Multicast-Sparse Mode (PIM-SM): Protocol Specification (Revised)*, Internet Engineering Task Force Internet-Draft, draft-ietf-pim-sm-v2-new-09.txt, by Fenner et al. February 2004 and *Internet Group Management Protocol, Version 3, Request for Comments (RFC)* 3376, by Cain et al., October 2002, which are hereby incorporated by reference as though fully set forth herein. PIM relies on an underlying topology-gathering protocol to populate a unicast routing table 425 (FIG. 4) of a routing information base (RIB 420) with routes. The RIB may store generalized route state for those unicast routes that are needed by unicast forwarding and PIM 430. For unicast routes of interest, PIM caches information in its PIM topology table 435. The cached information may include next-hop addresses, next-hop interfaces, connected flags (indicating whether the addresses are directly connected) and metrics. The routes in the RIB table may be provided directly from a unicast routing table or by separate routing protocols, such as the Border Gateway Protocol version 4 (BGP4) and Multi-protocol extensions to BGP4 (MBGP). BGP4 is an interdomain routing protocol used to perform interdomain routing (for the internetwork layer) through the computer network. The routers 200 (hereinafter "neighbors") may exchange routing and network layer reachability information (NLRI) among autonomous systems over a reliable trans-port layer connection, such as TCP. An adjacency is a relationship formed between selected neighbors for the purpose of exchanging routing messages and abstracting the network topology.

BGP4 is generally capable of only carrying routing information for IPv4; accordingly, MBGP extends BGP4 to allow carrying of routing information for multiple network layer protocols, including IPv6 addresses. MBGP extends BGP4 to associate these network layer protocols with next hop information and NLRI, including NLRI for multicast forwarding. Address Family Identifiers (AFIs) and Subsequent Address Family Identifiers (SAFIs) are used to identify the network layer protocols and the type of NLRI. MBGP and AFI/SAFI Address Family are well known and described in RFC 2858, by T. Bates et al. (2000) and RFC 1700 by J. Reynolds et al (1994), which are hereby incorporated by reference.

FIG. 4 is a schematic block diagram illustrating the functional infrastructure 400 of the router 200. The functional infrastructure 400 is preferably separated into a control plane 410 and a data plane 470, wherein separation is specified in terms of software components overlayed onto hardware elements, such as the route processors 210 and line cards 260. The data plane components/elements are configured to retrieve data packets from the network and provide those packets to forwarding logic of the router (and vice versa). In contrast, the control plane components/elements are used to manage/control traffic forwarding operations of the router. The infrastructure 400 allows the router to continue performing traffic forwarding operations throughout the data plane 470 in the presence of a failure and/or software restart within the control plane 410.

In the illustrative embodiment, the router operating system 232 implements multicast components as separate software process modules that are individually restartable and distributed over active route processors 210 and line cards 260 which, in turn, are individually hot-swapable and may have redundant (standby) backups. To that end, the data plane multicast components include MFIBs 1-N 480 executing on the line cards, whereas the control plane multicast components include the RIB 420, PIM 430, IGMP 440 and a multicast RIB (MRIB 450) executing on the route processors 210. Operationally, the control plane of the router builds the MRIB 450 (and, more specifically, its multicast routing table 455) after exchanging routing information with the neighbors. For example, PIM provides MRIB with a chosen reverse path forwarding (RPF) address and interface for each route, which is used by the data plane to accept packets for forwarding through the router. The primary role of the MRIB 450 is to facilitate communication between the various multicast components, i.e. coordinate distribution of state between the protocol applications (e.g. PIM, IGMP, etc.) and between these protocols and MFIB. As a result, MRIB provides the next hop router information and a multicast-capable path to each multicast destination. The MFIB 480 is derived from the MRIB and is embodied as one or more multicast forwarding tables 500 that are populated on the line cards 260 and whose contents describe how to forward data packets through the router.

FIG. 5 is a schematic block diagram of an illustrative embodiment of a MFIB multicast forwarding table 500 that may be used herein. The MFIB forwarding table 500 comprises a plurality of entries 510, each of which is populated by a multicast routing protocol, such as PIM, with routing information (i.e. a route). Each entry 510 includes a group address field 512 containing a multicast group network (IP) address, a source address field 514 containing a source IP address and a mask field 516 containing a mask value indicating the number of most significant bits of the group (and source) address needed to form a prefix.

Each MFIB forwarding table entry 510 also includes an ingress interface field 520 that specifies an ingress interface on which an incoming multicast packet should be accepted, as well as an egress interface(s) field 530 containing a list of egress (forwarding) interfaces over which the incoming packet should be forwarded. One or more control flags 522, 532 may be associated with each interface of the entry, wherein the control flags specify certain actions/behavior to be taken by the router in response to the reception of the incoming packet. For example, a control flag F 534 indicates whether an accepted multicast packet matching the entry is to be forwarded over an associated interface, a control flag SP 536 is used to signal the route processor of the arrival of a multicast data packet and a control flag NS 538 is used to control the behavior of a forwarding engine (i.e. MFIB) in asserting the SP flag 536.

In response to receiving the incoming packet from a neighbor, the MFIB 480 performs a lookup into its forwarding table 500 to find a route of an entry 510 that matches a multicast destination address of the packet. The matching route instructs the router as to which egress interfaces the packet should be forwarded. For certain multicast routing protocols (such as PIM-SM and PIM-SSM), the multicast packet is typically accepted on a single ingress interface, i.e. the RPF interface that represents the shortest path to the source, and is forwarded out a set of egress interfaces to other destinations (routers) that have expressed interest in receiving the data traffic. The ingress interface 520 for the matching entry may have one or more asserted control flags 522 instructing the data plane 470 to signal the control plane 410 when the multicast packet is received at the router. The arrival of the multicast packet on that ingress interface is thus a data-driven event.

Data-driven events cause changes in state and control messages exchanged among a multicast routing protocol, such as PIM, executing on the router and its neighbors. In the illustrative multicast NSF router architecture, the data plane 470 notifies the control plane 410 of the data-driven event (via a control signal) and the control plane interprets that event in order to re-converge on the correct forwarding state. The MFIB 480 is the multicast component in the data plane that notifies MRIB 450 in the control plane of the data-driven event. MRIB then passes that notification to PIM 430, which uses the reception of multicast data packets that are to be forwarded by the router to infer portions of the current network topology used to forward the packets. The control signal received by PIM indicates that a data-driven event occurred for a particular source and group address 512, 514 of a multicast data packet that was received at a particular interface of the router. Reception of a multicast packet can thus be interpreted as an event signal to modify the contents of the MFIB forwarding table 500.

In the illustrative embodiment, if a packet is received on an egress interface that is used for forwarding out of the router, the data plane (e.g. MFIB) communicates the data-driven event to the control plane (e.g. PIM). Protocol negotiation between the router and other PIM-enabled routers on the link, including the neighbor that forwarded the packet, is then used to determine which router should be forwarding traffic over the interface and link. Such protocol negotiation occurs in the control plane, requiring "live" PIM components 430 on all the routers. Here, PIM employs conventional assert messages to determine which router should be forwarding the packet over the link and which router is in error. The PIM assert protocol negotiation procedure is well-known and described in the previously incorporated *Protocol Independent Multicast-Sparse Mode (PIM-SM): Protocol Specification (Revised)*, Internet Engineering Task Force Internet-Draft, draft-ietf-pim-sm-v2-new-09.txt.

Multicast routers may be configured to create multicast distribution trees that control the path along which IP Multicast traffic takes through the network in order to deliver traffic to all host receivers. Two example types of multicast distribution trees are source trees and shared trees.

The simplest form of a multicast distribution tree is the source tree, having its root at the source and branches forming a spanning tree through the network to the host receivers. Because this tree uses the shortest path through the network, it is also referred to as an SPT. Here, a special notation of (S,G) may be used. (S,G) enumerates an SPT where S is the IP address of the source and G is the multicast group address. The (S,G) notation implies that a separate SPT exists for each individual source sending to each group.

Unlike source trees that have their root at the source, shared trees use a single common root placed at some chosen point in the network. This shared root may be referred to as the Rendezvous Point (RP). When using a shared tree, sources send their traffic to the root and then the traffic is forwarded down the shared tree to reach all host receivers. Since all sources in the multicast group use a common shared tree, a wildcard notation written as (*, G) may represent the tree. In this case, * means all sources, and G represents the multicast group. Typically, both SPTs and Shared Trees are loop-free. Messages are replicated only where the tree branches.

Members of multicast groups can join or leave at any time, therefore the distribution trees must be dynamically updated. When all the active host receivers on a particular branch stop requesting the traffic for a particular multicast group, the routers may prune that branch from the distribution tree and stop forwarding traffic down that branch. If one host receiver on that branch becomes active and requests the multicast traffic the router will dynamically modify the distribution tree and start forwarding traffic again.

Shortest path trees allow for the creation of an optimal path between the source and the host receivers. In at least many or most instances, this provides for a minimum amount of network latency in the forwarding multicast traffic. Here, the routers in the tree have to maintain path information for each source in a multicast routing table. Considering the potentially large number of sources and groups that may be established, attention should be given with respect to the limited memory resources in the routers.

Shared trees allow for a minimum or reduced amount of state to be maintained in each router. This lowers the overall memory requirements in a network that allows for only shared trees. In shared trees, the paths between the source and the host receivers may not always be optimal paths. This may introduce some latency in packet delivery.

In such an IP multicasting environment, individual consumers may desire to switch "quickly" between sources without experiencing (e.g. undue or noticeable) delays in receipt of multicast flows. For example, consider Broadcast TV in the IP Fabric for Media (IPFM) environment (formerly known as PMN). Using conventional IP multicasting (e.g. based on IGMP/PIM), much signaling and processing may be necessary to process a join or leave, as adjustments to the multicast distribution tree are made. Thus, it may take some time before a join or leave takes effect, providing an undue or noticeable delay.

Thus, in this context as well as others, it would be desirable to provide one or more features to facilitate a relatively reasonable or quick response time (e.g. without undue or noticeable delay) for switching between multimedia flows. For high-end video delivered at 120 frames per second, for example, a relatively reasonable or fast response time would be under 10 milliseconds.

Accordingly, in at least some implementations described herein, a multicast distribution tree (e.g. a shared tree) may be established during an initial setup phase. Thereafter, individual consumers may switch quickly between sources without invoking conventional signaling and adjustments to the multicast distribution tree.

For high-bandwidth applications, and those having a relatively large number of groups and group members, maintaining all multicast flows through the network to all group members may result in a very large (and e.g. potentially unrealizable) bandwidth consumption. Given video streams of 6 Gbps, and network links of about 10 or 20 Gbps, one may readily appreciate that not too many streams can be transported simultaneously.

Accordingly, in at least some implementations described herein, a system for opting out of one stream in order to opt into another stream may be realized and achieved. For example, it may be desirable to switch from a first camera to a second camera, and then back to the first camera just a few seconds later.

As described herein, what may be provided in IP multicasting and other similar environments is a selective filtering of multicast data streams for selected group members of a multicast group connected in a (e.g. pre-established) multicast distribution tree. Put another way, in at least some configurations, what may be desirable is a technique to facilitate a relatively responsive, "on-the-fly" enabling/disabling of the delivery of IP multicast to selected group members on an individual basis, without signaling and adjustments being made to the multicast distribution tree.

Figure 6:
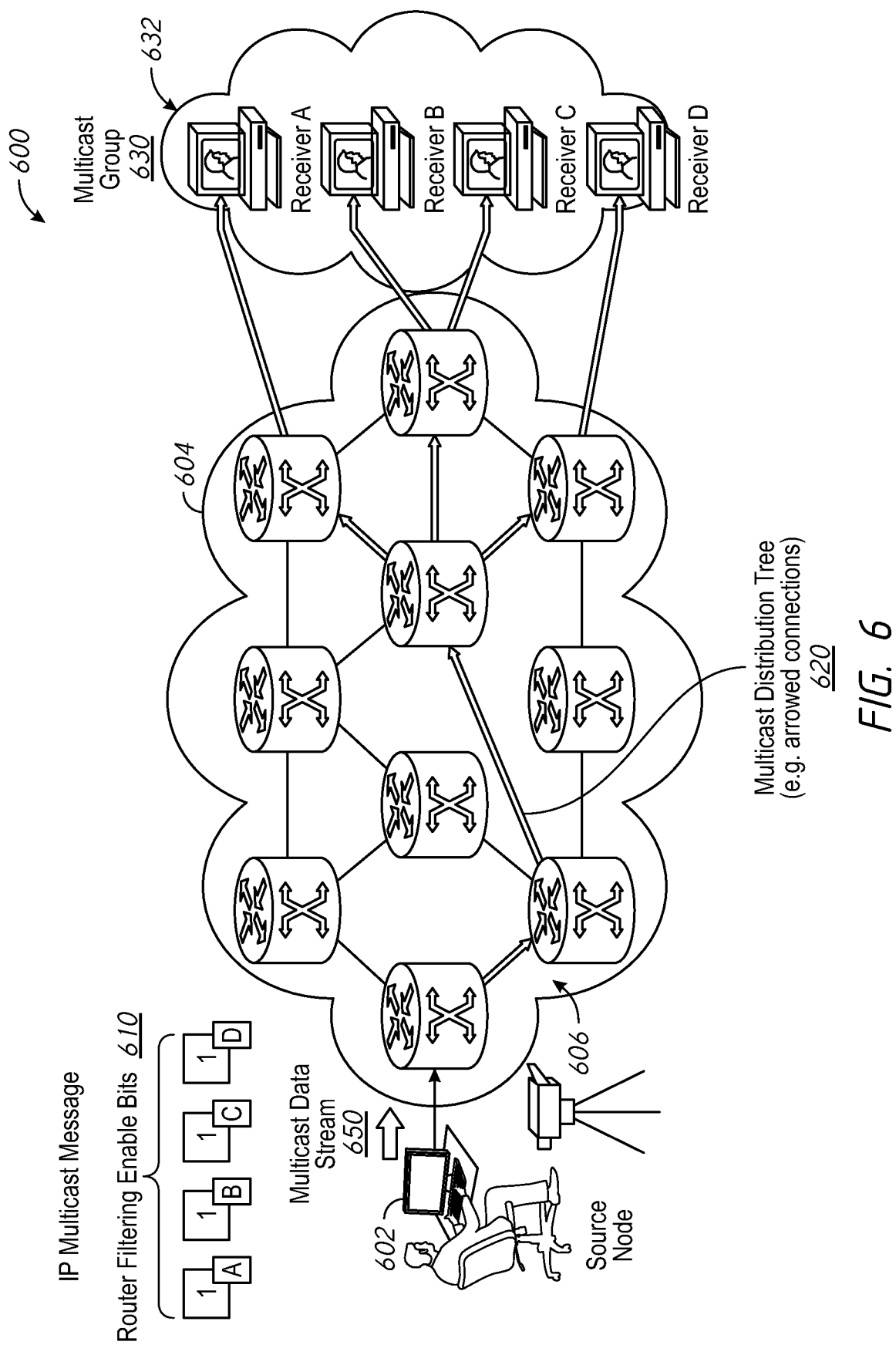
FIG. 6 is an illustrative representation of a more general communication system within which at least some implementations of the present disclosure may be practiced.

FIG. 6 is an illustrative representation of a communication system 600 within which at least some implementations of the present disclosure may be practiced. Communication system 600 may include one or more communication networks 604 having a plurality of router nodes 606. A source node 602 which connected in communication network 604 may be configured to generate and multicast a data stream 650 to a multicast group 630 with use of IP multicast messages. The multicast group 630 may include a plurality of group members corresponding to a plurality of host receivers 632 (e.g. host receivers A, B, C, and D) connected to some of the router nodes 606. The IP multicast messages may use a multicast group address to address communications to the multicast group 630, downstream along a multicast distribution tree 620 formed by some (selected ones) of the router nodes 606. Without any additional feature or technique in place, all host receivers 632 that have joined the multicast group 630 will receive the multicast data stream 650.

According to some implementations as indicated in FIG. 6, the IP multicast message for the multicast data stream 650 may include a plurality of router filter enable bits 610. Each one of the router filtering enable bits 610 may be assigned to a respective one of the group members (host receiver A, B, C, or D) for a selective enabling of router filtering of the multicast data stream 650 otherwise intended for the respective group member. This may alternatively be regarded as a selective issuing of an instruction to perform router filtering at the router node. In the example of FIG. 6, the number of router filter enable bits 610 is four (4), and these bits correspond to the four group members, host receivers A, B, C, and D, respectively.

At least some of the router nodes 606 in the communication network 604 may be configured to allow or disallow a forwarding of the multicast data stream 650 based on the router filtering enable bits 610. More specifically, the router node may be configured to allow or disallow the forwarding of the multicast data stream 650 based on the router filtering enable bits 610 and group member indicator bits stored in memory at the router node (not shown in FIG. 6). Each group member indicator bit may be assigned to a respective one of the group members (host receiver A, B, C, or D) and indicate whether the respective group member is reachable downstream from the router node via the multicast distribution tree 620 (e.g. as a reachability indicator). As different sets of group member indicator bits may be stored in association with different multicast groups, the group member indicator bits may be selectively retrieved from the memory based on an identifier or address of the multicast group.

Figure 7C:
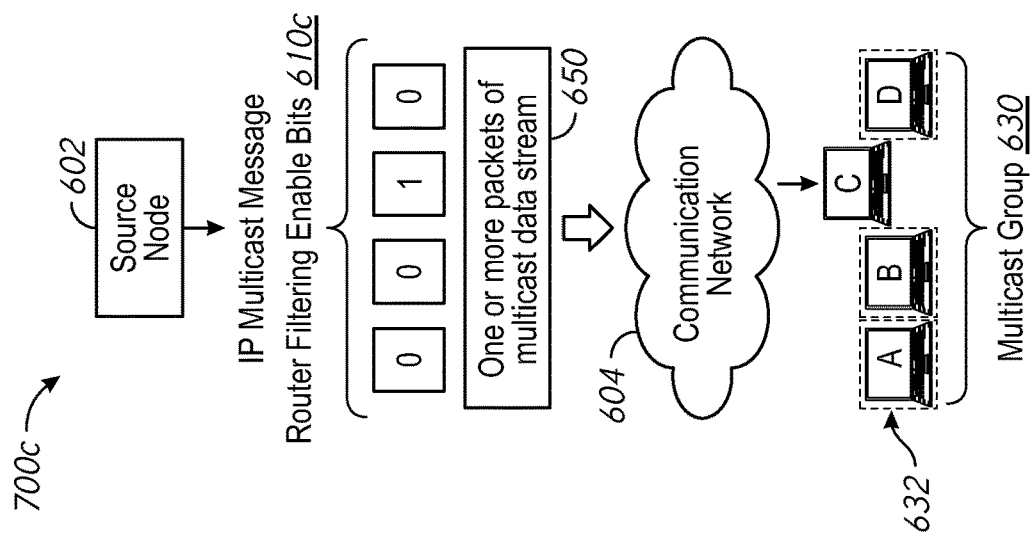
FIGS. 7A, 7B, and 7C are example illustrative representations the communication system of FIG. 6 with use of IP multicast messages which include router filtering enable bits.
Figure 7B:
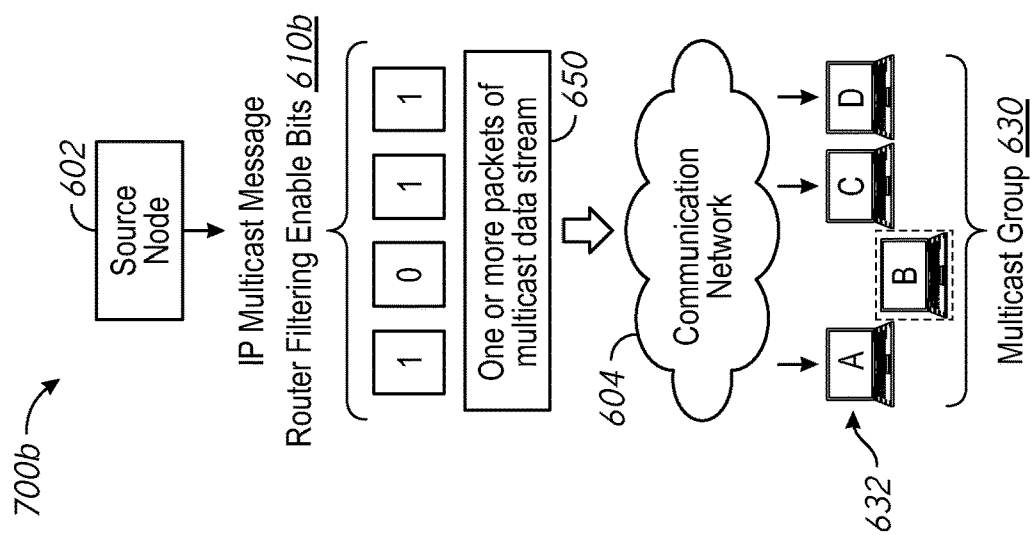
Figure 7A:
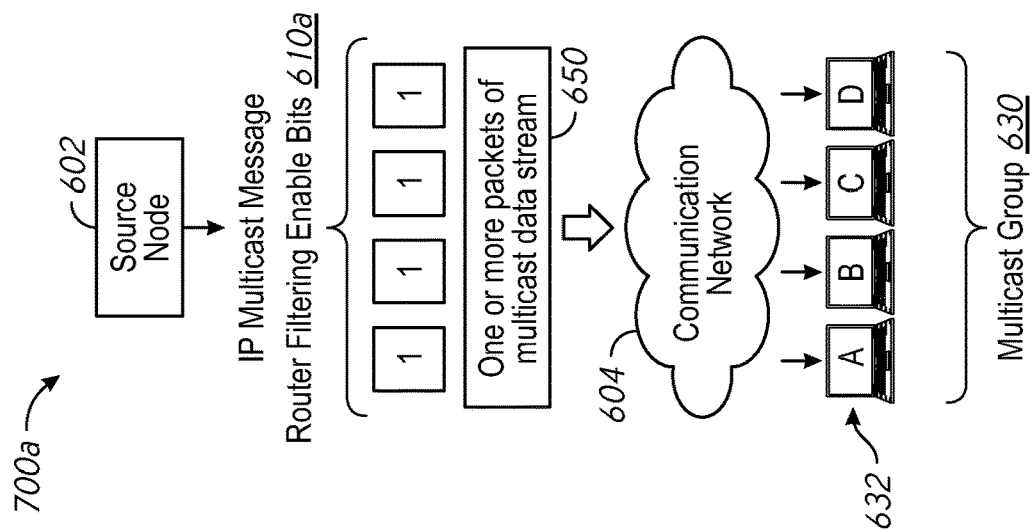

FIGS. 7A, 7B, and 7C are example illustrative representations the communication system 600 of FIG. 6 with use of IP multicast messages which include router filtering enable bits. These figures are used to provide a basic idea regarding at least some implementations of the present disclosure. Again, in each of the examples of FIGS. 7A, 7B, and 7C, the number of router filter enable bits 610 is four (4), and these bits correspond to the four group members, host receivers A, B, C, and D, respectively. Here, a router filtering enable bit having a value of "0" is for enabling router filtering for a respective group member (i.e. prevent the group member from receiving the multicast data stream), and a value of "1" is for disabling the router filtering for the respective group member (i.e. allow the group member to receive the multicast data stream).

More specifically in FIG. 7A, the router filtering enable bits 610A are set to "1 1 1 1" and therefore all host receivers A, B, C, and D may receive the multicast data stream 650. In FIG. 7B, the source node 602 or other node may set the router filtering enable bits 610B to "1 0 1 1". Therefore, host receivers A, C, and D will receive the multicast data stream 650 but host receiver B will not, as router filtering is enabled to prevent host receiver B from receiving multicast data stream 650. In FIG. 7C, the source node 602 or other node may set the router filtering enable bits 610C to "0 0 1 0". Therefore, host receiver C will receive the multicast data stream 650 but host receivers A, B, and D will not, as router filtering is enabled to prevent host receivers A, B, and D from receiving multicast data stream 650.

Figure 8:
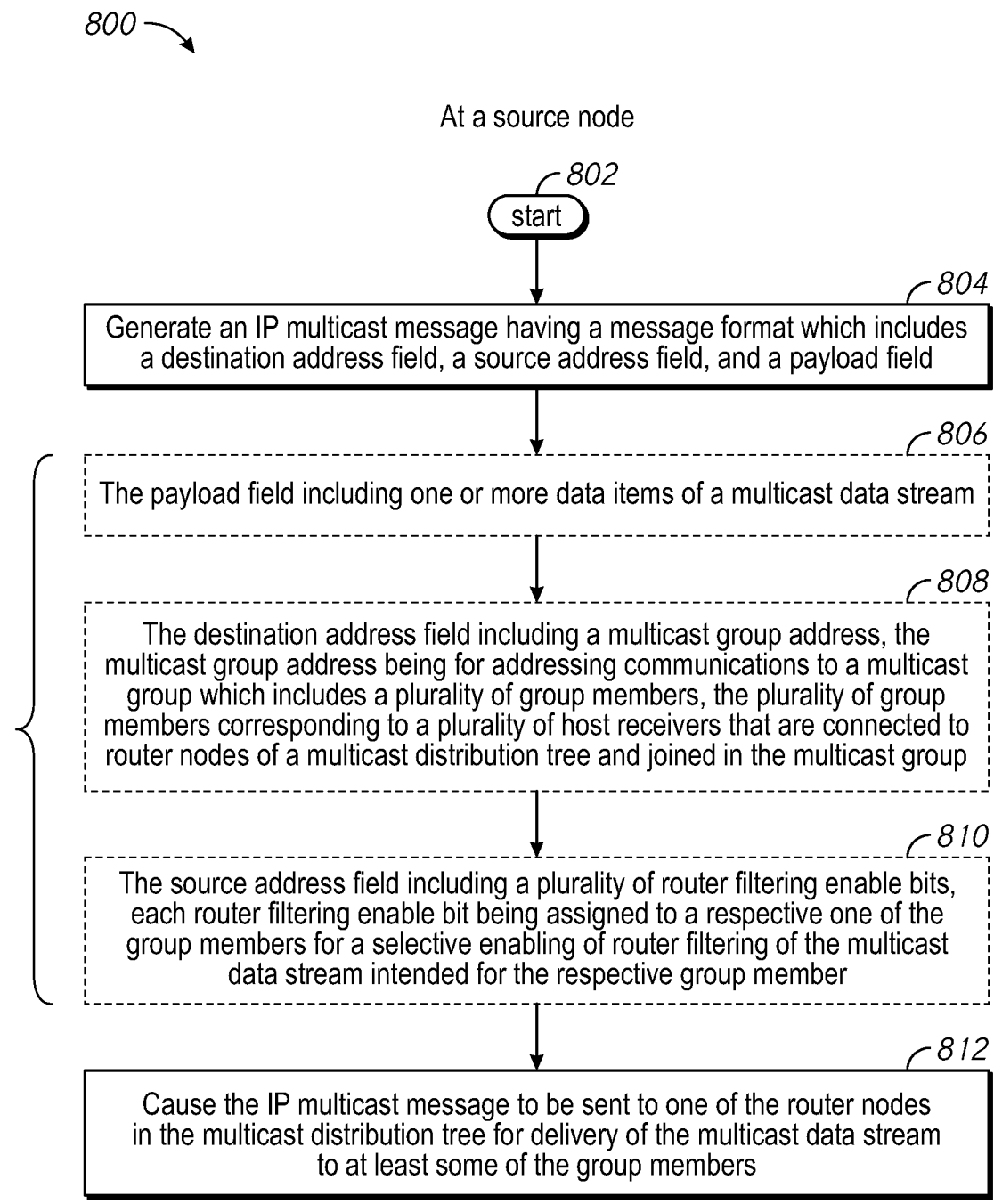
FIG. 8 is a flowchart for describing a method for use in selectively filtering an IP multicast data stream for selected group members of a multicast group according to some implementations of the present disclosure, where the method may be performed at a network node, such as a source node, e.g. a rendezvous point (RP) or "mock" RP.

FIG. 8 is a flowchart 800 for describing a method for use in selectively filtering an IP multicast data stream for selected group members of a multicast group according to some implementations of the present disclosure. The method may be performed at a network node, such as a source node configured to multicast a data stream to a multicast group of host receivers via a multicast distribution tree. The source node may be an RP or "mock" RP. The network node may include one or more processors. one or more memories coupled to the one or more processors, and/or one or more interfaces for communication. The method may be embodied as a computer program product (e.g. memory) including a non-transitory computer readable medium and instructions stored in the computer readable medium, where the instructions are executable on one or more processors of the network node for performing the steps of the method.

Again, the method may be performed at a network node, such as a source node, which may be an RP or mock RP. This source node may be configured to multicast a data stream to a multicast group of host receivers via a multicast distribution tree. When a multicast distribution tree is established, the paths for multicast delivery are setup and bandwidth along those paths are reserved. Beginning at a start block 802 of FIG. 8, the source node may generate an IP multicast message (step 804 of FIG. 8). The IP multicast message may have a message format which includes a payload field, a destination address field, and a source address field. The payload field may include one or more data items of a multicast data stream (step 806 of FIG. 8). The destination address field may include a multicast group address (step 808 of FIG. 8). The multicast group address may be for addressing communications to the multicast group which includes a plurality of group members. The plurality of group members may correspond to a plurality of host receivers that are connected to router nodes of the multicast distribution tree and joined in the multicast group.

The source address field may include a plurality of router filtering enable bits in place of a source address (step 810 of FIG. 8). Alternatively, a different field in the IP multicast message may include the plurality of router filtering enable bits. Each router filtering enable bit may be assigned to a respective one of the group members for a selective enabling of router filtering of the multicast data stream otherwise intended for the respective group member. This may alternatively be regarded as a selective issuing of an instruction to perform router filtering at the router node.

The source node may cause the generated IP multicast message to be sent to (e.g. a first) one of the router nodes in the multicast distribution tree, for delivery of the multicast data stream to at least some of the group members (step 812 of FIG. 8). The at least some group members may exclude those group members assigned to a router filtering enable bit that is enabled for router filtering of the multicast data stream. On the other hand, the at least some group members that receive the multicast data stream may include those group members assigned to a router filtering enable bit that is disabled.

In step 804 of FIG. 8, generating the IP multicast message may include (selectively) setting at least some of the router filtering enable bits to enable the router filtering of the multicast data stream for a selected some of the group members, thereby preventing the receipt of the multicast data stream to these selected group members. Similarly in step 804 of FIG. 8, generating the IP multicast message may include (selectively) setting at least some of the router filtering enable bits to disable the router filtering of the multicast data stream for a selected some of the group members, thereby enabling the receipt of the multicast data stream to these selected group members.

Note that, in the method of FIG. 8, at least some of the router nodes in the multicast distribution tree may be configured to allow or disallow a forwarding of the multicast data stream based on the router filtering enable bits and stored group member indicator bits associated with the multicast group. Each group member indicator bit may be assigned to a respective one of the group members (e.g. in the same order as the router filtering enable bits) and indicate whether the respective group member is reachable downstream from the router node via the multicast distribution tree.

Figure 9:
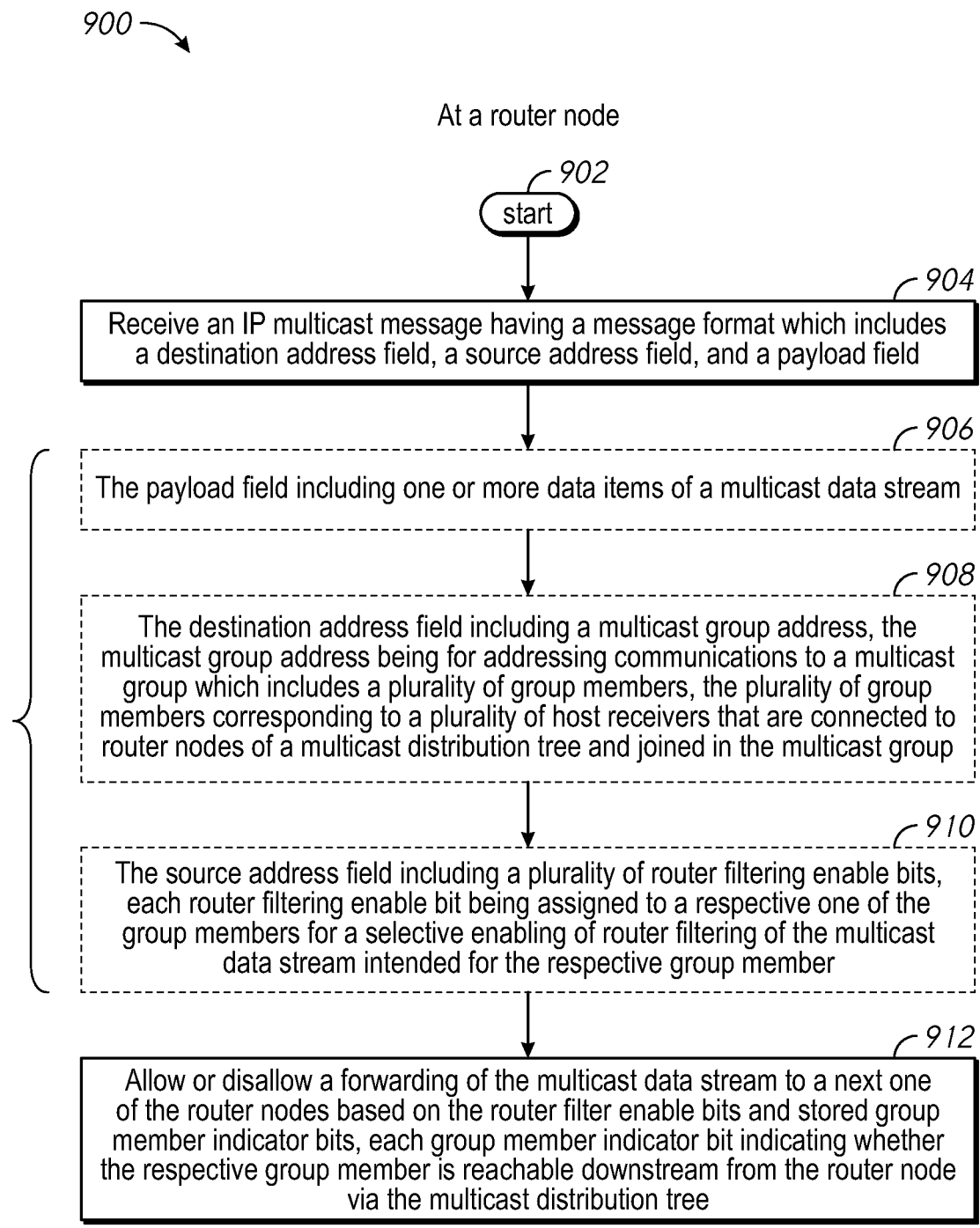
FIG. 9 is a flowchart for describing a method for use in selectively filtering IP multicast data streams for selected group members of a multicast group according to some implementations of the present disclosure, where the method may be performed at a network node, such as a router node (e.g. on each egress interface thereof) in a multicast distribution tree.

FIG. 9 is a flowchart 900 for describing a method for use in selectively filtering IP multicast data streams for selected group members of a multicast group according to some implementations of the present disclosure. The method may be performed at a network node, such as a router node (e.g. on each egress interface thereof). The router node may be configured to forward a multicast data stream to a multicast group of host receivers via a multicast distribution tree. The network node may include one or more processors. one or more memories coupled to the one or more processors, and/or one or more interfaces for communication. The method may be embodied as a computer program product (e.g. memory) including a non-transitory computer readable medium and instructions stored in the computer readable medium, where the instructions are executable on one or more processors of the network node for performing the steps of the method.

Again, the method may be performed at a network node, such as a router node in the multicast distribution tree. The router node may be generally configured to forward a multicast data stream to a multicast group of host receivers via the multicast distribution tree. When a multicast distribution tree is established, the paths for multicast delivery are setup and bandwidth along those paths are reserved. The router node may be further configured to maintain storage of a plurality of group member indicator bits. Each group member indicator bit may be assigned to a respective one of the group members (e.g. in the same order as the router filtering enable bits) and indicate whether the respective group member is reachable downstream from the router node via the multicast distribution tree.

Beginning at a start block 902 of FIG. 9, the router node may receive an IP multicast message (step 904 of FIG. 9). For example, the router node may receive the IP multicast message from a source node or a preceding router node in the multicast distribution tree. The IP multicast message may have a message format which includes a destination address field, a source address field, and a payload field. The payload field may include one or more data items of a multicast data stream (step 906 of FIG. 9). The destination address field may include a multicast group address (step 908 of FIG. 9). The multicast group address may be for addressing communications to the multicast group which includes a plurality of group members. The plurality of group members may correspond to a plurality of host receivers that are connected to router nodes of the multicast distribution tree and joined in the multicast group.

The source address field may include a plurality of router filtering enable bits in place of a source address (step 910 of FIG. 9). Each router filtering enable bit may be assigned to a respective one of the group members for a selective enabling of router filtering of the multicast data stream otherwise intended for the respective group member. This may alternatively be regarded as a selective issuing of an instruction to perform router filtering at the router node.

Next, the router node may allow or disallow a forwarding of the multicast data stream based on the router filtering enable bits and the stored group member indicator bits associated with the multicast group (step 912 of FIG. 9). Again, each group member indicator bit may be assigned to a respective one of the group members (e.g. in the same order as the router filtering enable bits) and indicate whether the respective group member is reachable downstream. In some implementations, the allowing or disallowing of step 912 may be performed with use of an access control list (ACL) at an egress interface of the router node.

Figure 10:
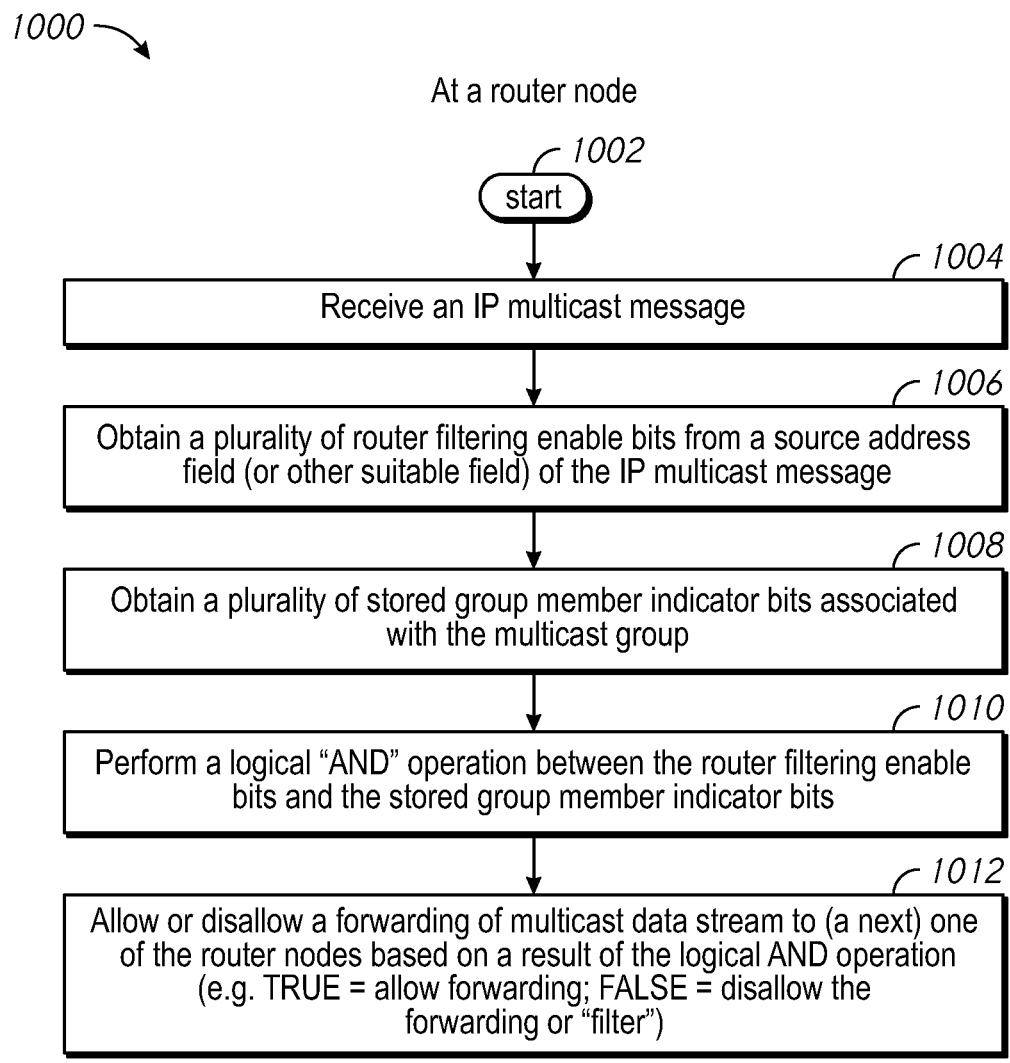
FIG. 10 is a flowchart for describing a method for use in selectively filtering IP multicast data streams for selected group members of a multicast group according to some implementations of the present disclosure, where the method may be performed at a network node, such as a router node (e.g. on each egress interface thereof) in a multicast distribution tree.

FIG. 10 is a flowchart 1000 for describing a method for use in selectively filtering IP multicast data streams for selected group members of a multicast group according to some implementations of the present disclosure. The method may be performed at a network node, such as a router node (e.g. on each egress interface thereof). The router node may be configured to forward a multicast data stream to a multicast group of host receivers via a multicast distribution tree. The network node may include one or more processors. one or more memories coupled to the one or more processors, and/or one or more interfaces for communication. The method may be embodied as a computer program product (e.g. memory) including a non-transitory computer readable medium and instructions stored in the computer readable medium, where the instructions are executable on one or more processors of the network node for performing the steps of the method.

A source node (e.g. an RP or mock RP) may provide an IP multicast data stream for delivery to a multicast group which includes a plurality of group members. The plurality of group members may correspond to a plurality of host receivers that are connected to router nodes of a multicast distribution tree and joined in the multicast group. The router node that is configured to perform the method may be one of the router nodes in this multicast distribution tree. Here, the router node may maintain storage of a plurality of group member indicator bits. Each group member indicator bit may be assigned to a respective one of the group members and indicate whether the respective group member is reachable downstream from the router node via the multicast distribution tree.

Beginning at a start block 1002 of FIG. 10, the router node may receive an IP multicast message (step 1004 of FIG. 10). The IP multicast message may have a message format which includes a destination address field, a source address field, and a payload field. The payload field may include one or more data items of a multicast data stream. The destination address field may include a multicast group address for addressing communications to the multicast group.

The router node may obtain a plurality of router filtering enable bits from the source address field of the IP multicast message (step 1006 of FIG. 10). The router filtering enable bits are provided in the source address field in place of a source address. Alternatively, the router node may obtain the router filtering enable bits from a different field of the IP multicast message. Each router filtering enable bit may be assigned to a respective one of the group members for a selective enabling of router filtering of the multicast data stream intended for the respective group member.

The router node may also obtain a plurality of stored group member indicator bits (step 1008 of FIG. 10). Each stored group member indicator bit may be assigned to a respective one of the group members (e.g. in the same order as the router filtering enable bits) and indicate whether the respective group member is reachable downstream from the router node via the multicast distribution tree. In step 1008, the group member indicator bits may be selected (e.g. from amongst different sets) based on an identification or address of the multicast group indicated in the IP multicast message.

In the method of FIG. 10, a router filtering enable bit having a value of "0" is for enabling router filtering of a respective group member, and a value of "1" is for disabling the router filtering for the respective group member. A group member indicator bit having a value of "0" is for indicating that the associated group member is unreachable or unavailable, and a value of "1" is for indicating that the associated group member is reachable downstream from the (particular) router node. Other suitable values for the enabling and disabling, indicating reachability and unreachability, may be utilized as an alternative.

Next, the router node may perform a logical "AND" operation between the (e.g. full set of) router filtering enable bits and the (e.g. full set of) stored group member indicator bits (step 1010 of FIG. 10). The router node may allow or disallow a forwarding of the multicast data stream to a next one of the router nodes based on a result of the logical "AND" operation (step 1012 of FIG. 10). For example, if the result of the logical "AND" operation is TRUE, then the router node may allow the forwarding of the multicast data stream; if the result of the logical "AND" operation is FALSE, then the router node may disallow the forwarding or "filter" the multicast data stream for the corresponding group member. In some implementations, the steps for allowing or disallowing may be performed with use of ACL at an egress interface of the router node.

Figure 11:
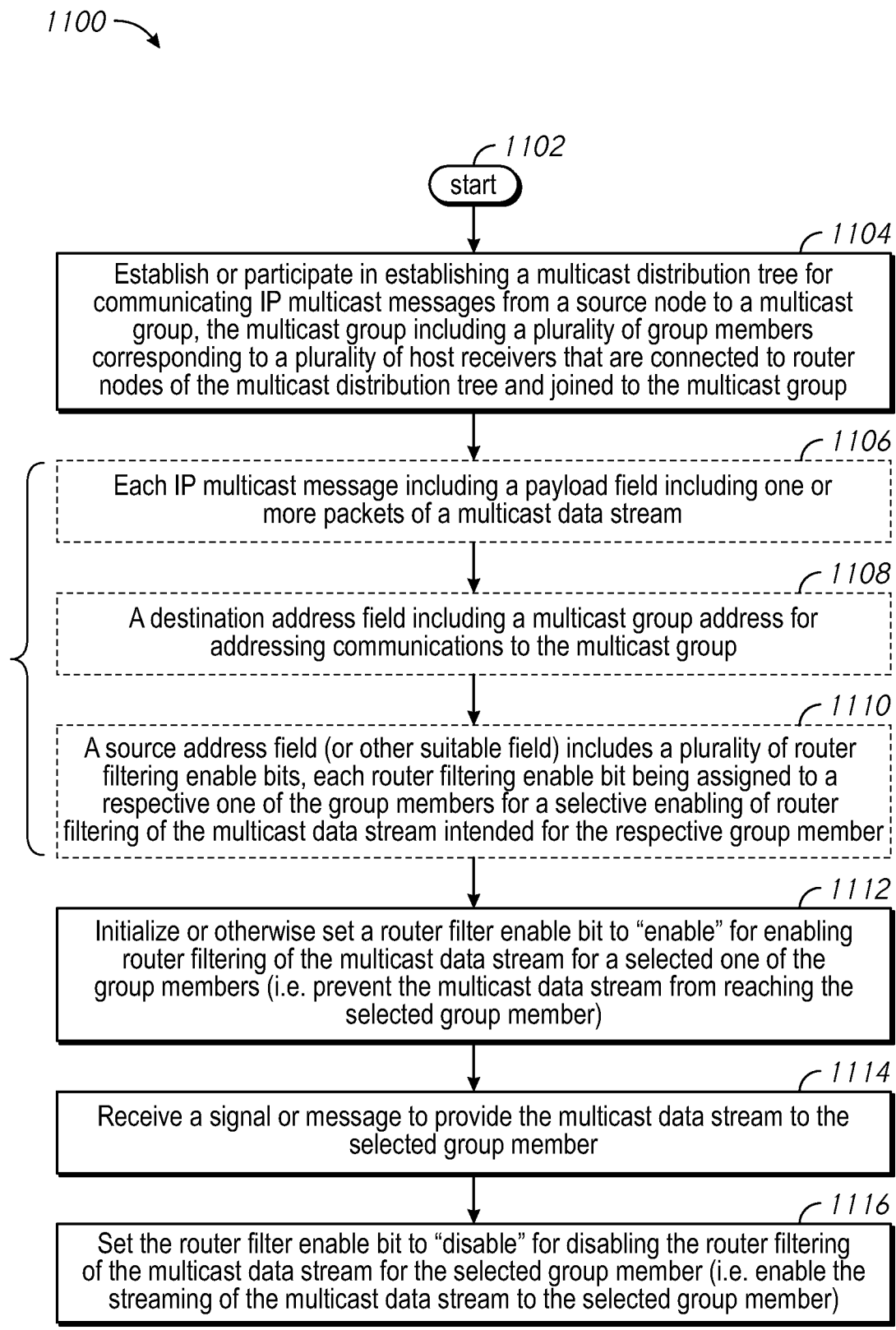
FIG. 11 is a flowchart for describing a method for use in selectively filtering an IP multicast data stream for selected group members of a multicast group according to some implementations of the present disclosure, where the method may be performed at a network node, such as a source node, e.g. an RP or mock RP.

FIG. 11 is a flowchart 1100 for describing a method for use in selectively filtering an IP multicast data stream for selected group members of a multicast group according to some implementations of the present disclosure. The method may be performed at a network node, such as a source node configured to multicast a data stream to a multicast group of host receivers via a multicast distribution tree. The source node may be an RP or a mock RP. The network node may include one or more processors. one or more memories coupled to the one or more processors, and/or one or more interfaces for communication. The method may be embodied as a computer program product (e.g. memory) including a non-transitory computer readable medium and instructions stored in the computer readable medium, where the instructions are executable on one or more processors of the network node for performing the steps of the method.

Again, the method may be performed at a network node, such as a source node (e.g. an RP or mock RP). Beginning at a start block 1102 of FIG. 11, the source node may establish or participate in the establishment of a multicast distribution tree for communicating IP multicast messages to a multicast group (step 1104 of FIG. 11). The multicast group may include a plurality of group members corresponding to a plurality of host receivers that are connected to router nodes of a multicast distribution tree and joined in the multicast group. When a multicast distribution tree is established, the paths for multicast delivery are setup and bandwidth along those paths are reserved.

Each IP multicast message may have a message format which includes a destination address field, a source address field, and a payload field. The payload field may include one or more data items of a multicast data stream (step 1106 of FIG. 11). The destination address field may include a multicast group address (step 1108 of FIG. 11). The multicast group address may be for addressing communications to the multicast group. The source address field may include a plurality of router filtering enable bits (step 1110 of FIG. 11). Alternatively, a different field in the IP multicast message may include the plurality of router filtering enable bits. Each router filtering enable bit may be assigned to a respective one of the group members for a selective enabling of router filtering of the multicast data stream otherwise intended for the respective group member.

In the initial IP multicast messages, the source node may initialize or otherwise set a router filter bit to "enable" for enabling a router filtering of the multicast data stream for a selected one of the group members (step 1112 of FIG. 11). This will initially prevent the multicast data stream from reaching the selected group member. Sometime thereafter, the source node may receive a signal or message to provide the multicast data stream to the selected group member (step 1114 of FIG. 11). In response to receiving the signal or message, the source node may set the router filter enable bit to "disable" for disabling the router filtering of the multicast data stream for the selected group member (step 1116 of FIG. 11). This will enable the forwarding of the multicast data stream to the selected group member.

As may be more apparent from the method of FIG. 11, the functionality associated with the enabling/disabling of multicast data delivery to selected group members is separated from the building, establishing, and/or maintenance of the multicast distribution tree. Again, when a multicast distribution tree is established, the paths for multicast delivery are setup and bandwidth along those paths are reserved. On-the-fly, enabling/disabling of the multicast data delivery to selected group members may be performed while maintaining the (same) multicast distribution tree, without (e.g. significant) adjustments or changes to the multicast distribution tree.

In at least some configurations, as the multicast tree establishment may be separated from the flow transportation itself, IPFM Broadcast TV workflows (as well as other similar workflows) may be supported with novel features. Here, for example, when an operator selects a source and destination from a broadcast controller panel, the multicast distribution tree may be established and ACLs programmed at each of the router node hops. A confirmation of this action may cause the "take" light to light up, indicating that the flow will follow when the "take" is complete. In response to actuation of the "take" button, the flow may be provided relatively quickly to the consumer.

Figure 12A:
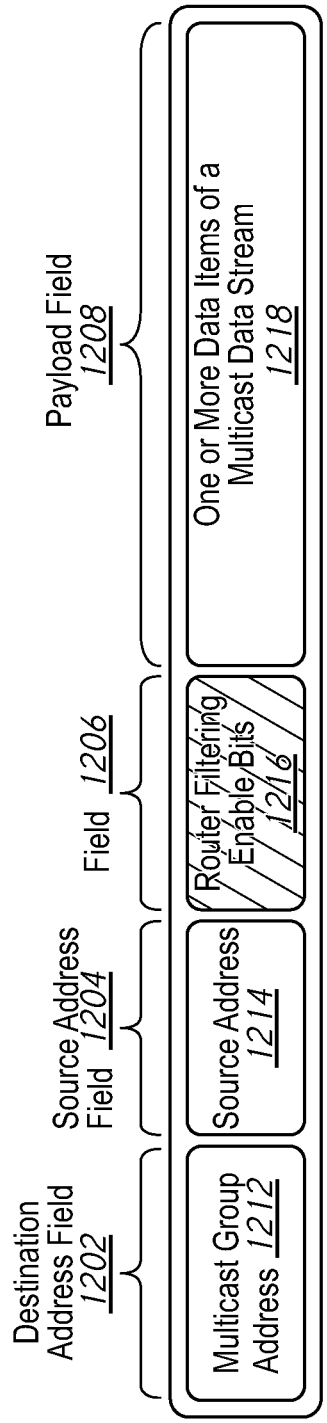
FIGS. 12A-12B are example IP multicast messages having router filtering enable bits according to at least some implementations of the present disclosure.
Figure 12B:
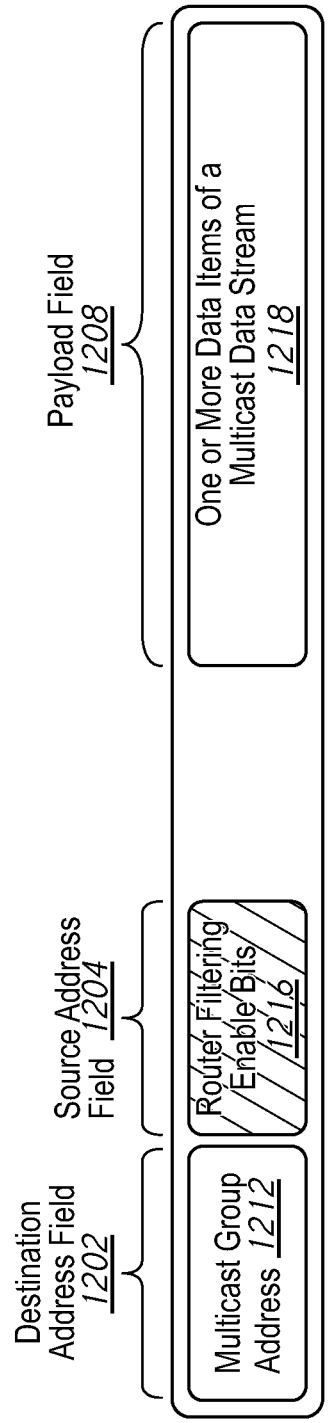

FIGS. 12A-12B are example IP multicast messages 1200A and 1200B according to at least some implementations of the present disclosure. In FIG. 12A, IP multicast message 1200A or packet is shown to have a message format which includes a destination address field 1202, a source address field 1204, and a payload field 1208. The payload field 1208 may be populated with or include one or more data items of a multicast data stream. The destination address field 1202 may be populated with or include a multicast group address 1212. The multicast group address 1212 may be for addressing the communications to a multicast group which includes a plurality of group members. The plurality of group members may correspond to a plurality of host receivers that are connected to router nodes of the multicast distribution tree and joined in the multicast group. The source address 1204 may be populated with or include a source address 1214 which identifies a source node which is a source of the multicast data stream.

IP multicast message 1200A may also include an additional field 1206, This field 1206 may be populated with or include a plurality of router filtering enable bits 1216. Each router filtering enable bit may be assigned to a respective one of the group members for a selective enabling of router filtering of the multicast data stream otherwise intended for the respective group member. Router filtering enable bits 1216 may be referred to as a set of bits and, in some implementations, may be or include a set of contiguous bits.

In some preferred implementations, as shown in the example IP multicast message 1200B or packet of FIG. 12B, the source address field 1204 may include the router filtering enable bits 1226. The router filtering enable bits 1216 may be populated in source address field 1204 in place of a source address. Note that, in at least many implementations of IP multicasting, the multicast source may be deemed irrelevant to the router(s). Here, the additional field 1206 of FIG. 12A may be unnecessary for providing any router filtering enable bits. Here again, router filtering enable bits 1216 may be referred to as a set of bits and, in some implementations, may be or include a set of contiguous bits.

FIGS. 13A and 13B are specific examples of source address fields 1300A and 1300B, respectively) that may be utilized for router filtering enable bits. Source address field 1300A in IP multicast message of FIG. 13A is of an IPv6 message type, whereas source address field 1300B in IP multicast message of FIG. 13B is of an IPv4 message type (Class E).

In some implementations with respect to FIG. 13A for IPv6, a new Scope (D) value may be allocated from IANA to indicate use of a bit mask or set of router filtering enable bits. As the field includes 112 bit positions, up to 112 host receivers may be accommodated. As an alternative, or in addition, a new, high-order unicast prefix may be allocated from IANA for use as a bit mask or set of router filtering enable bits.

In some implementations with respect to FIG. 13B for IPv4, a Class E (Experimental) range may be specifically reserved for use as a bit mask or set of router filtering enable bits. As an alternative, or in addition, a private address may be used (e.g. private address 10/8) to provide, in the remainder of the address, the bit mask or set of router filtering enable bits.

Figure 14A:
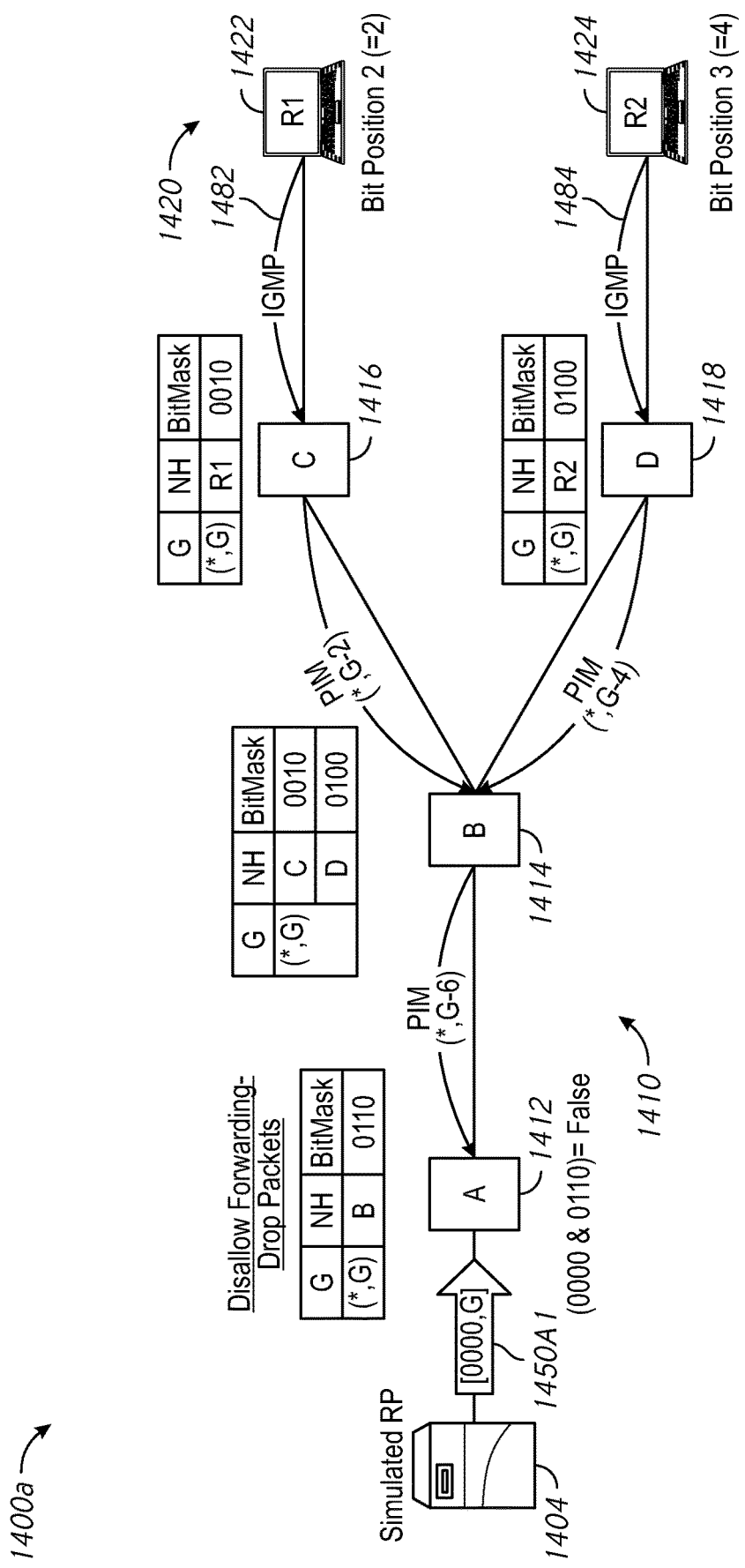
FIGS. 14A, 14B, and 14C are schematic representations of various example deliveries of a multicast data stream through a multicast distribution tree with use of router filter enabling according to some implementations of the present disclosure.
Figure 14B:
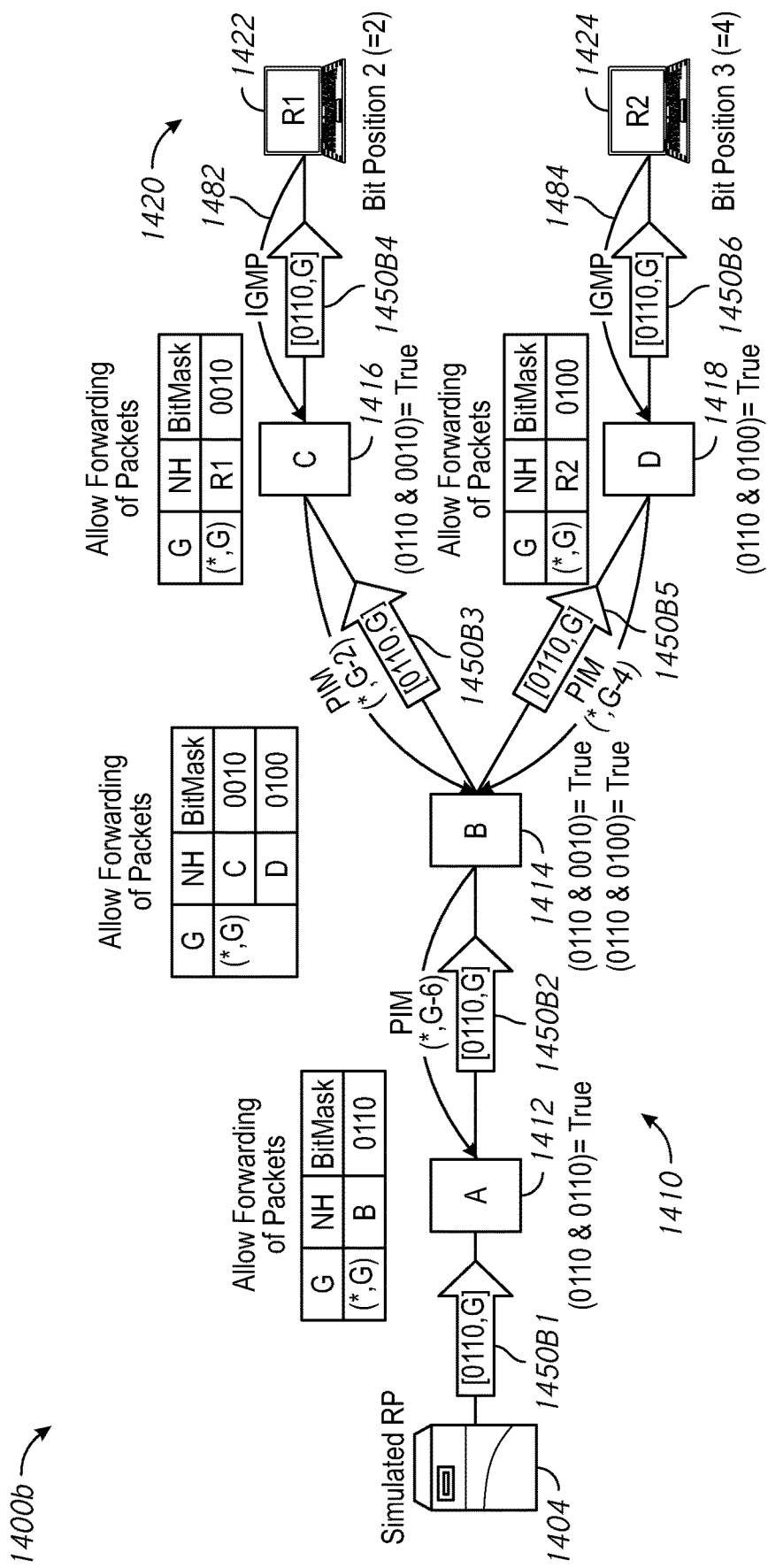
Figure 14C:
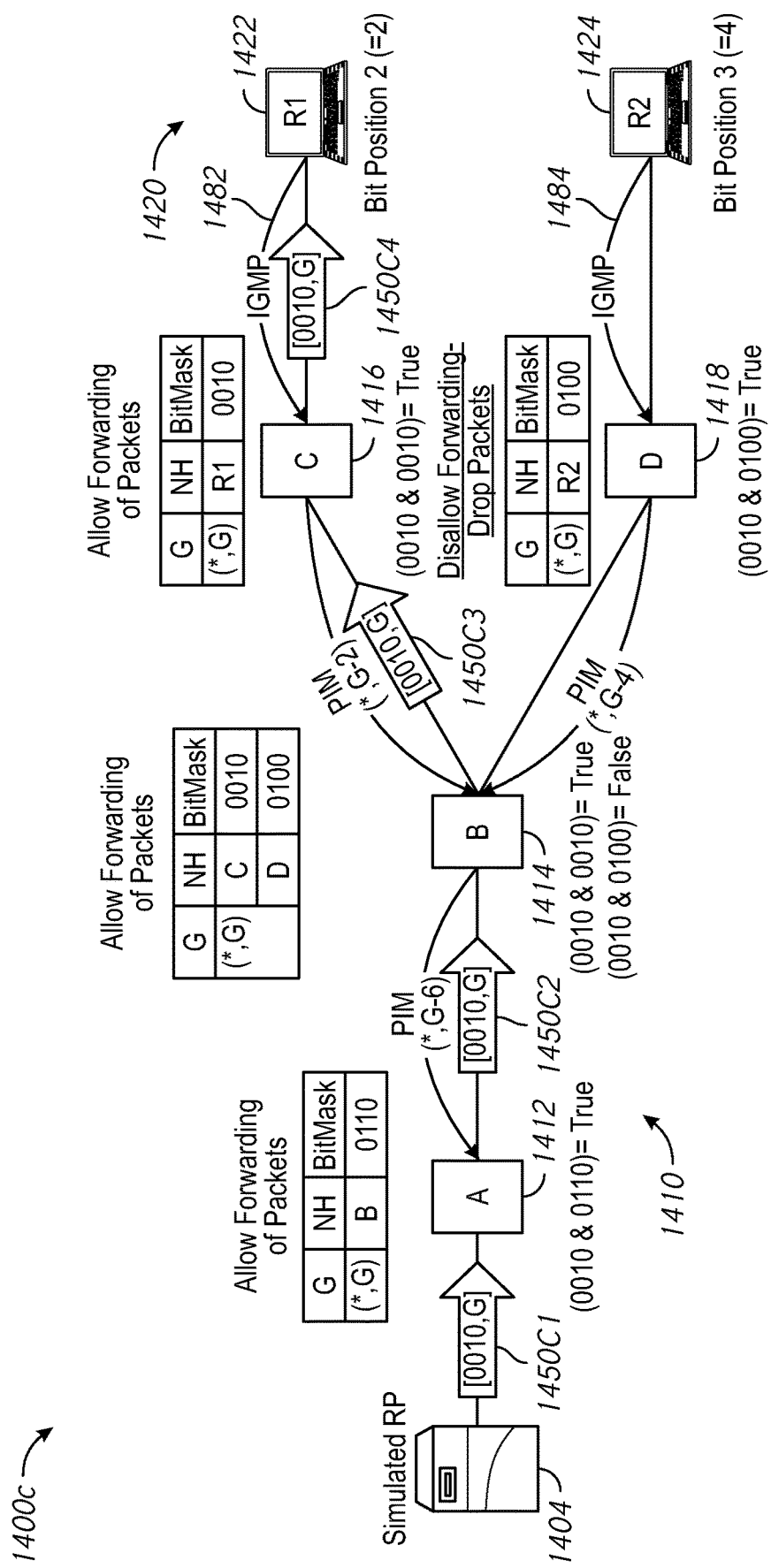

FIGS. 14A, 14B, and 14C are schematic representations 1400A, 1400B, and 1400C of various example deliveries of an IP multicast message of a multicast data stream through a multicast distribution tree, with use of selectable router filtering according to some implementations of the present disclosure. The multicast distribution tree may involve a plurality of router nodes 1410 including a plurality of router nodes 1412, 1414, 1416, and 1418 designated as A, B, C, and D, respectively. A source node 1404 (e.g. an RP or mock RP) may cause IP multicast messages to be sent to at least (e.g. a first) one of the router nodes 1412 in the multicast distribution tree. The IP multicast messages may be sent for delivery of the multicast data stream to at least some of a plurality of group members of a multicast group. The group members may correspond to a plurality of host receivers 1420 (i.e. host receivers 1422 and 1424 designated as R1 and R2, respectively, in the figures) that are connected to router nodes of the multicast distribution tree and joined in the multicast group. Each one of the router nodes 1410 in FIGS. 14A, 14B, and 14C may have an ACL/T-CAM filter, and is shown together with a stored table which stores a node identifier of a node (a "next hop" or NH node) in association with a bit mask (i.e. group member indication bits), for each egress interface of the router node. T-CAM is a ternary, content-addressable memory "T-CAM" which is one type of high-speed memory which may be used in a router node.

In FIG. 14A, an IP multicast message 1450A1 is associated with router filtering enable bits that are initially set to "0 0 0 0", indicating that router filtering for all group members/host receivers 1422 and 1424 is enabled (i.e. prevent IP multicast data delivery). f In this example, bit position "2" has been assigned to host receiver 1422 (i.e. R1) and bit position "3" to host receiver 1424 (i.e. R2). The mapping between bit positions and host receivers 1422 and 1424 may be configured on the egress router. In some implementations, the mapping may be signaled from a host receiver to a router node (re-)using IGMP. As indicated in FIG. 14A, host receivers 1422 and 1424 may join the multicast group with use of suitable messages, such as messages 1482 and 1484, respectively. In some implementations, the "bit positions" may be carried in the PIM Joins (e.g. as attributes) and aggregated (e.g. OR'd) moving upstream. This way, on each branch of the tree, the router/switch knows which "bit positions" (i.e. host receivers) are reachable. This information may be used to program the ACLs of the router nodes. In some implementations, "bit position" PIM attributes may be declared as Forward Transitive "F-bit set" (RFC5384); this way, the bit mask will be received by router node 1412 (i.e. A) to setup/program the egress filter accordingly.

In order for PIM to setup a shared tree, the rendezvous point or "RP" for that multicast group typically needs to be identified. Here, the video encoder may become a "mock" RP (i.e. source node 1404). A mock RP may be configured to route PIM Joins, but does not (necessarily) perform any (e.g. significant) functions of an actual RP. Router node 1412 may use the IP address of the mock RP and program the interface to the mock RP as the incoming interface. In some implementations, the egress routers/switches may configure "threshold infinity" to prevent from switching to the source tree. Typically, a router node will create an (S,G) state for sources that are directly connected to it. In some implementations as provided herein, an invalid address is used as the source and therefore the IP address will never be considered connected. Hence, no (S,G) state will be created by the router node. Thus, in at least some implementations, the router node 1412 (i.e. the ingress router) may refrain from creating (S,G) state.

As source node 1404 begins to send messages, no bit positions in the source address field are set, and therefore the packet is not forwarded as the egress ACL filter at router node 1412 prevents it. Thus, although the multicast distribution tree is setup and ready to forward packets, packets are only forwarded down the tree once they match the egress ACL/T-CAM filter (see e.g. FIGS. 14B and 14C).

In FIG. 14B, an IP multicast message 1450B1 is associated with router filtering enable bits that are set to "0 1 1 0", indicating that router filtering for all group members/host receivers 1422 and 1424 is disabled. Router node 1412 and all other router nodes 1414, 1416, and 1418 may therefore allow the multicast data stream to pass to reach host receivers 1422 and 1424. As illustrated, IP multicast message 1450B1 passes through router node 1412 as IP multicast message 1450B2, which passes through a first egress interface of router node 1414 as IP multicast message 1450B3, which passes through router node 1416 as IP multicast message 1450B4 to reach host receiver 1422. Also as illustrated, IP multicast message 1450B2 also passes through a second egress interface of router node 1414 as IP multicast message 1450B5, which passes through router node 1418 as IP multicast message 1450B6 to reach host receiver 1424.

In FIG. 14C, an IP multicast message 1450C1 is associated with router filtering enable bits that are set to "0 0 1 0", indicating that router filtering for group member corresponding to host receiver 122 is disabled whereas router filtering for group member corresponding to host receiver 124 is enabled. Therefore, as illustrated, IP multicast message 1450C1 passes through router node 1412 as IP multicast message 1450C2, which passes through the first egress interface of router node 1414 as IP multicast message 1450C3, which passes through router node 1416 as IP multicast message 1450C4 to reach host receiver 1422. IP multicast message 1450C2 is prevented from passing through the second egress interface of router node 1414 to reach router node 1418 and, therefore, is prevented from being delivered to host receiver 1424.

Figure 15:
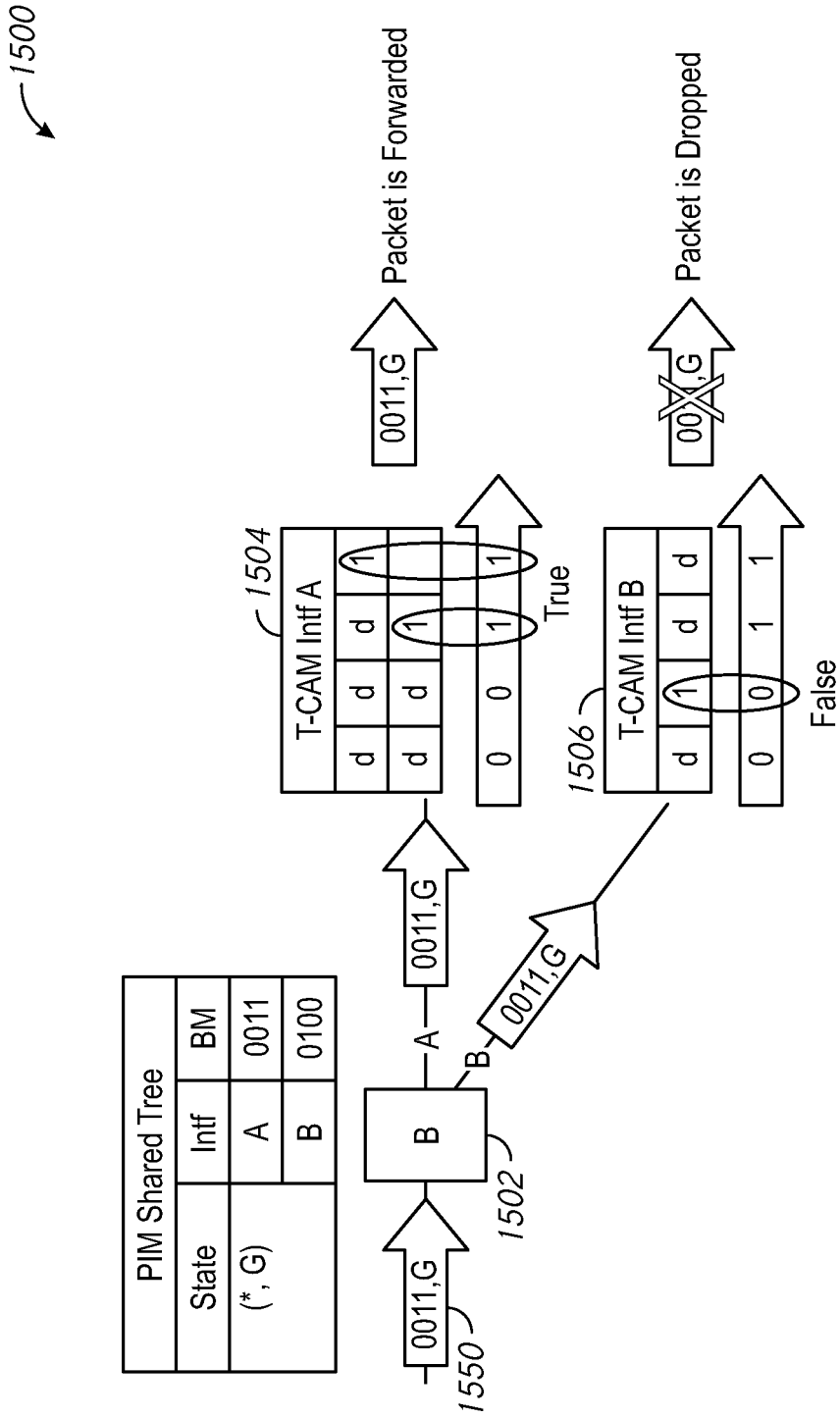
FIG. 15 is a schematic representation of an example delivery of a multicast data stream through a router node having a plurality of egress interfaces.

FIG. 15 is a schematic representation 1500 of an example delivery of an IP multicast message 1550 of a multicast data stream through a router node 1502 (designated as router "B"). In the illustrative example, IP multicast message 1550 includes router filtering enable bits having a setting of "0 0 1 1". Router node 1502 has a plurality of egress interfaces which include egress interfaces A and B. Egress interfaces A and B are shown with tables 1504 and 1506, respectively, representing T-CAM Intr A and B thereof. The group member indicator bits (indicated as a bit mask or "BM") at egress interface A (T-CAM Intr A) indicate a setting of "0 0 1 1", whereas the group member indicator bits (also indicated as a bit mask or "BM") at egress interface B (T-CAM Intr B) indicate a setting of "0 1 0 0". Each egress interface may perform processing which includes a logical "AND" operation as depicted in FIG. 15. A result of the logical "AND"

operation at egress interface A is "TRUE" and therefore IP multicast message 1550 is allowed to pass through egress interface A; on the other hand, a result of the logical "AND" operation at egress interface B is "FALSE" and therefore IP multicast message 1550 is not allowed to pass through egress interface B (i.e. the packet is dropped).

In the example of FIG. 15, the desired functionality may be programmed or configured through an ACL. An example of ACL processing is provided below:

ipv4 access-list bimf_filter
   10 permit ipv4 240.0.0.1 240.255.255.254 host 224.2.2.2
   20 permit ipv4 240.0.0.2 240.255.255.253 host 224.2.2.2
   30 deny ipv4 any host 224.2.2.2
   40 permit ipv4 any any
!

Note that the above-example makes use of the IPv4 Class E as the source address. If configured on an interface, it would allow forwarding for bit positions ("BPs") 1 and 2 for group address 224.2.2.2 but deny any other bit position, where all other traffic would pass as normal.

In some alternative implementations of the present disclosure, a control message separate from the above-described IP multicast messages may carry the set of router filtering enable bits to the router nodes for the selective enabling/disabling of the router filtering. In these alternative implementations, operation at each of the router nodes may otherwise be the same or substantially the same. Such control messages may be sent to the router nodes in response to changes or updates to the router filtering for selected group members.

In some optimal implementations, all router nodes and/or switches may be configured to perform the bit mask filtering of the present disclosure. In other implementations, however, techniques of the present disclosure still operate properly even when some routers or switches in the network do not support the bit mask filtering. For example, if router node 1414 (i.e. B) does not support bit mask filtering, it will not participate in the filtering but rather just simply replicate all packets downstream. Here, the succeeding router nodes 1416 and 1418 (i.e. C and D) will perform the filtering as needed.

For some applications, the number of bit positions that can be encoded in a source address field may be limited. In other applications, however, e.g. deployments like Professional Media Networks (PMN), the number of receivers is relatively low. Here, using IPv4, the use of 27 bits may be sufficient (e.g. at least as a starting point). In some alternative implementations, each bit position may correspond to a plurality of host receivers—not just a single host receiver. For example, with PMN, it is likely that multiple host receivers need to receive the same content and, for that reason, may be able to share the same bit position. Therefore, in actual practice, 27 combinations of content groups may be created. If 27 bit positions is insufficient, then migrating to IPv6 may be utilized as a good alternative (i.e. 112 bits).

Thus, in at least some configurations, it is possible to influence packet forwarding by simply setting/resetting a bit mask at the source. When host receivers need to join or leave a multicast stream, there is no need to Join or Remove the tree itself. The multicast distribution tree may be maintained and stay in place (e.g. as a provisioning). This way, it is relatively expedient to Join/Leave a multicast flow, without the need to pull all the content to the egress router/switch. In some implementations, a customer may set the source address using its own tools and controllers (e.g. with use of a REST API) into the multicast server.

In some implementations, techniques of the present disclosure may be applied to an IP Fabric for Media (IPFM) environment (formerly known as PMN). Here, a multicast distribution tree may be initially setup to ensure bandwidth is available along the paths; initially, however, flows along the path are prevented. In Broadcast TV for IPFM, the techniques of the present disclosure may be applied to workflows that follow a multi-step (e.g. 2-step) process or function. The multi-step process may involve a first process, such as a process for "preview," and a second process, such as process for a "take." The first "review" process may ensure that the flow will be feasible. Here, the "take" button may light up without any receipt of flow. The second "take" process may provide the receipt of the actual flow in response to the take button being actuated or pressed.

In other implementations, the techniques of the present disclosure may be applied to end devices that are software and running on servers. Here, an orchestrator may select which servers are capable of hosting the flow and thereafter select among them to place the sender and receiver endpoint workflow.

In even other implementations, the techniques of the present disclosure may be applied to a virtual workload use case. Here, a multicast distribution tree may be built for a "shortlisted" source-receiver pair. Subsequently, when an orchestrator selects a specific source-receiver pair, then the selected source bit mask is changes so that the flow is transported to the specific set of receivers; the rest of the multicast distribution trees may be cleared.

Accordingly, what has been described at least for some configurations of IP multicasting is a selective filtering of multicast data streams for selected group members of a multicast group. Put another way, in at least some configurations, what has been provided is a technique to provide a relatively responsive, "on-the-fly" enabling/disabling of the delivery of IP multicast to selected group members on an individual basis, without signaling and adjustments to be performed with respect to the pre-established multicast distribution tree.

In one illustrative example, a source node may be configured to multicast a data stream to a multicast group of host receivers via a multicast distribution tree. The source node may generate one or more IP multicast messages, each of which have a message format which includes a destination address field, a source address field, and a payload field. The payload field may include one or more data items of a multicast data stream. The destination address field may include a multicast group address for addressing communications to the multicast group. The multicast group may include a plurality of group members corresponding to a plurality of host receivers that are connected to router nodes of the multicast distribution tree and joined in the multicast group. The source address field may include a plurality of router filtering enable bits in place of a source address. Each router filtering enable bit may be assigned to a respective one of the group members for a selective enabling of router filtering of the multicast data stream intended for the respective group member. This may alternatively be regarded as a selective issuing of an instruction to perform router filtering at the router node. The generated IP multicast message to be sent from the source node to (e.g. a first) one of the router nodes in the multicast distribution tree, for delivery of the multicast data stream to at least some of the group members. The at least some group members may exclude those group members assigned to a router filtering enable bit that is enabled for router filtering of the multicast data stream. The at least some group members that receive the multicast data stream may include those group members assigned to a router filtering enable bit that is disabled.

In another illustrative example, an IP multicast group may include a plurality of group members corresponding to a plurality of host receivers that are connected to router nodes of a multicast distribution tree and joined in the multicast group. At least some of the router nodes may store a plurality of group member indicator bits, where each such bit is assigned to a respective one of the group members and indicates whether the respective group member is reachable downstream from the router node. The router node may receive an IP one or more IP multicast messages, each of which has a message format including a destination address field, a source address field, and a payload field. The payload field may include one or more data items of a multicast data stream. The destination address field may include a multicast group address for addressing communications to the multicast group. The source address field may include a plurality of router filtering enable bits in place of a source address, where each such bit may be assigned to a respective one of the group members for a selective enabling of router filtering of the multicast data stream intended for the respective group member. The router node may allow or disallow a forwarding of the multicast data stream to a next one of the router nodes in the multicast distribution tree based on the router filter enable bits and the stored group member indicator bits. For example, the router node may perform a logical "AND" operation between the router filter enable bits and the stored group member indicator bits, and allow or disallow the forwarding of the multicast data stream based on a result of the logical "AND" operation.

In yet another illustrative example, an IP multicast group may include a plurality of group members corresponding to a plurality of host receivers that are connected to router nodes of a multicast distribution tree and joined in the multicast group. A router node may be configured to store a group member indicator bit assigned to a respective one of the group members and indicate whether the respective group member is reachable downstream from the router node. The router node may receive a first IP multicast message which has a message format including a destination address field, a source address field, and a payload field. The payload field may include one or more first data items of a multicast data stream. The destination address field may include a multicast group address for addressing communications to the multicast group. The source address field may include a router filtering enable bit assigned to the respective group member which may be set to "enabled" to disallow the forwarding of the first IP multicast message from the router node. The router node may subsequently receive a second IP multicast message which has the message format including the destination address field, the source address field, and the payload field. The payload field may include one or more second data items of the multicast data stream. The destination address field may include the multicast group address for addressing communications to the multicast group. The source address field may include the router filtering enable bit assigned to the respective group member which may be set to "disabled" to allow the forwarding of the second IP multicast message from the router node.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

Although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

It will also be understood that, although the terms "first," "second," etc. may be used herein to describe various elements, these elements should not be limited by these terms. These terms are used to distinguish one element from another. For example, a first router node could be termed a second router node, and similarly, a second router node could be termed a first router node, without changing the meaning of the description, so long as all occurrences of the "first router node" are renamed consistently and all occurrences of the "second router node" are renamed consistently. The first router node router node and the second router node are both router nodes, but they are not the same router node.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further note, although the term "router" or "router node" has been primarily used herein, the term may be used to describe any suitable routing device or switch, server, etc.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method, comprising:
   generating an IP multicast message having a message format, the IP multicast message comprising:
      a payload field comprising data items of a multicast data stream;

a destination address field comprising a multicast group address, the multicast group address being for addressing communications to a multicast group which includes a plurality of group members, the plurality of group members corresponding to a plurality of host receivers that are connected to router nodes of a multicast distribution tree and joined in the multicast group; and a source address field comprising a plurality of router filtering enable bits, wherein each router filtering enable bit of the plurality of router filtering enable bits is assigned to a respective group member of the plurality of group members for a selective enabling of router filtering of the multicast data stream intended for the respective group member; and causing the IP multicast message to be sent to a first router node of the router nodes in the multicast distribution tree for delivery of the multicast data stream to at least some of the group members, wherein the first router node allows forwarding of the IP multicast message to a first group member having a first value for a first router filtering enable bit assigned to the first group member and disallows forwarding of the IP multicast message to a second group member having a second value for a second router filtering enable bit assigned to the second group member.

2. The method of claim 1, further comprising:
performing the method at a source node of the multicast distribution tree,
wherein the plurality of router filtering enable bits are included in the source address field in place of a source address.

3. The method of claim 2, wherein the source node comprises a rendezvous point (RP) or a mock RP.

4. The method of claim 1, wherein the at least some of the group members exclude those group members assigned to a router filtering enable bit that is enabled for router filtering of the multicast data stream.

5. The method of claim 4, wherein the at least some of the group members include those group members assigned to a router filtering enable bit that is not enabled for router filtering of the multicast data stream.

6. The method of claim 1, wherein the router filtering of the multicast data stream is provided at some of the router nodes configured to allow or disallow a forwarding of the multicast data stream based on the router filtering enable bits and stored group member indicator bits, each group member indicator bit being assigned to a respective one of the group members and indicating whether the respective group member is reachable downstream from the router node via the multicast distribution tree.

7. The method of claim 1, wherein generating the IP multicast message includes:
setting at least some of the router filtering enable bits to enable the router filtering of the multicast data stream for at least some of the other group members, which prevents the delivery of the multicast data stream to the at least some other group members.

8. The method of claim 1, where each one of at least some of the router nodes is configured to allow or disallow a forwarding of the multicast data stream based on the router filtering enable bits and stored group member indicator bits associated with the multicast group, wherein each group member indicator bit is assigned to a respective one of the group members and indicates whether the respective group member is reachable downstream from the router node via the multicast distribution tree.

9. The method of claim 1, further comprising:
receiving a signal or message to provide the multicast data stream to the one of the group members; and
in response to receiving the signal or message, setting one of the router filtering enable bits to disable the router filtering of the multicast data stream to the group member.

10. The method of claim 1, wherein the each router filtering enable bit serves as an instruction to a router node to perform router filtering of the multicast data stream for the respective group member reachable downstream from the router node.

11. A method comprising:
receiving, at a router node an IP multicast message having a message format including:
a payload field comprising data items of a multicast data stream;
a destination address field comprising a multicast group address, the multicast group address being for addressing communications to a multicast group which includes a plurality of group members, the plurality of group members corresponding to a plurality of host receivers that are connected to router nodes of a multicast distribution tree and joined in the multicast group via the multicast distribution tree; and
a source address field comprising a plurality of router filtering enable bits, each router filtering enable bit of the plurality of router filtering bits being assigned to a respective one group member of the plurality of group members for a selective enabling of router filtering of the multicast data stream intended for the respective group member;
allowing, by the router node, forwarding of the multicast data stream to a next router node of the router nodes having a first bit value for a first router filter enable bits and stored group member indicator bits; and
disallowing, by the router node, forwarding of the multicast data stream to another next router node of the router nodes having a second bit value for a second router filter enable bit assigned to the another router node and the stored group member indicator bits, each stored group member indicator bit of the stored group member indicator bits being assigned to the respective group member of the plurality of group members and indicating whether the respective group member is reachable downstream from the router node via the multicast distribution tree.

12. The method of claim 11, wherein allowing forwarding of the multicast data stream comprises allowing or disallowing is forwarding of the multicast data stream an access control list (ACL) at an egress interface of the router node.

13. The method of claim 11, further comprising providing allowing of forwarding of the multicast data stream at each egress interface of the router node.

14. The method of claim 11, further comprising:
in response to a host receiver being added to or joined in the multicast group, setting one of the group member indicator bits to indicate that the host receiver is reachable downstream from the router node via the multicast distribution tree.

15. The method of claim 14, wherein the host receiver is joined in the multicast group in response to receiving a JOIN message from the host receiver, in accordance with Internet Group Management Protocol (IGMP).

16. The method of claim 11, further comprising:

in response to a host receiver being removed from the multicast group, setting one of the group member indicator bits to indicate that the host receiver is not reachable downstream from the router node via the multicast distribution tree.

17. A router node comprising:

a processor;

an ingress interface to receive an IP multicast message comprising:
- a payload field comprising data items of a multicast data stream,
- a destination address field comprising a multicast group address, the multicast group address being for addressing communications to a multicast group comprising a plurality of group members, the plurality of group members corresponding to a plurality of host receivers that are connected to router nodes of a multicast distribution tree and joined in the multicast group via the multicast distribution tree, and
- a source address field comprising a plurality of router filtering enable bits, wherein each router filtering enable bit of the plurality of router filtering enable bits is assigned to a respective group member of the plurality of group members for a selective enabling of router filtering of the multicast data stream intended for the respective group member; and one or more egress interfaces to:
- allow a forwarding of the multicast data stream to a next router node of the router nodes having a first bit value for a first router filter enable bit assigned to the next router node and stored group member indicator bits; and
- disallow forwarding of the multicast data stream to another next router node of the router nodes having a second bit value for a second router filter enable bit assigned to the another router node and the stored group member indicator bits, each stored group member indicator bit being assigned to the respective group member of the plurality of group members and indicating whether the respective group member is reachable downstream from the router node via the multicast distribution tree.

18. The router node of claim 17, further comprising:

wherein each egress interface comprises an access control list (ACL) filter to perform the router filtering, wherein the field comprises a source address field, and wherein the router filtering enable bits are included in the source address field in place of a source address.

19. The router node of claim 17, wherein the source address field corresponds to a source node.

20. The router node of claim 19, wherein the source node comprises a rendezvous point (RP) or a mock RP.

\* \* \* \* \*